US007536335B1

(12) United States Patent
Weston et al.

(10) Patent No.: US 7,536,335 B1
(45) Date of Patent: May 19, 2009

(54) SYSTEM AND METHOD FOR IMPLEMENTING FOREIGN EXCHANGE CURRENCY FORWARDS

(75) Inventors: Brian A. Weston, Katonah, NY (US); Glenn Jacoby, Upper Saddle River, NJ (US); Simon Gerald Briton Walker, Surrey (GB)

(73) Assignee: Bloomberg L.P., New York, NY (US)

( * ) Notice: Subject to any disclaimer, the term of this patent is extended or adjusted under 35 U.S.C. 154(b) by 0 days.

(21) Appl. No.: 09/476,935

(22) Filed: Dec. 30, 1999

(51) Int. Cl.
*G06Q 40/00* (2006.01)
(52) U.S. Cl. .......................................... 705/37; 705/35
(58) Field of Classification Search ................ 35/35–37
See application file for complete search history.

(56) References Cited

U.S. PATENT DOCUMENTS

| | | | |
|---|---|---|---|
| 4,677,552 A | 6/1987 | Sibley, Jr. | |
| 5,136,501 A * | 8/1992 | Silverman et al. | 705/37 |
| 5,375,055 A | 12/1994 | Togher et al. | |
| 5,758,328 A * | 5/1998 | Giovannoli | 705/26 |
| 5,774,553 A | 6/1998 | Rosen | |
| 5,787,402 A * | 7/1998 | Potter et al. | 705/37 |
| 5,809,483 A | 9/1998 | Broka et al. | |
| 5,890,138 A * | 3/1999 | Godin et al. | 705/26 |
| 5,890,140 A | 3/1999 | Clark et al. | |
| 5,924,082 A | 7/1999 | Silverman et al. | |
| 5,924,083 A | 7/1999 | Silverman et al. | |
| 5,978,485 A | 11/1999 | Rosen | |
| 6,014,644 A * | 1/2000 | Erickson | 705/37 |
| 6,317,727 B1 * | 11/2001 | May | 705/37 |

OTHER PUBLICATIONS

Woerner, Roland Becker, Stephanie Collier, Marsha eBay for Dummies, A reference for the Rest of Us, IDG Books Worldwide, 1999, p. 133-135.*
Cooke, Stephanie Will Brokers Go Broke? Euromoney, No. 325, pp. 90-93, May 1996.*

(Continued)

*Primary Examiner*—Hani Kazimi
(74) *Attorney, Agent, or Firm*—Frank J. DeRosa; Frommer Lawrence & Haug LLP

(57) ABSTRACT

A computer system and method support foreign exchange (FX) forward trading for both order posting and execution. The system includes a central server for tracking currency trades; a plurality of trading workstations; and at least one remote server interfacing the trading workstations to the central server, with the at least one remote server mediating the currency trades between traders using the workstations by consulting pre-set trading configurations associated with each trader. Currency brokers and traders use the system through a plurality of data input and display screens to deal in currency forwards in an efficient manner. The system and method support both voice and electronic data to interface with existing trading systems such as voice-based networks, permitting order entry anywhere in the world. The system includes features such as the filtering of entities by specified criteria such as bad credit, bad geography, etc. using the pre-set trading configurations associated with each trader, so that such filtered entities are not even displayed to a trader; request for quotes functions, in which up to eight people can be selected and stored in a database who a trader is willing to trade with; and a penalty box for not trading or displaying trades of an annoying trader.

10 Claims, 48 Drawing Sheets

OTHER PUBLICATIONS

San Francisco Chronicle, Bidder Beware Say eBay Critics, Dec. 22, 1998.*

Author unk., FXWEEK, Dealing and Netting, FXDeal Offers FX Order Service on Bloomberg, dated Oct. 21, 1996, from url/http://www.fxweek.com/previous/oct2196.html (3 pp).

Queree, Anne, Autodealing Moves to the Internet, Corporate Finance (Dialog 01579262 02-30251), dated Jan. 8, 1998, from url/wysiwyg://0/http://www.dialogclassic.com/history.html (2 pp).

Mathieson, Steven, FX Deal Made Available on Internet, Corporate Finance (Dialog 01519074 01-70062), dated Jul. 12, 1997, from url/wysiwyg://0/http://www.dialogclassic.com/history.html (1 pg).

Queree, Anne, Banks to Invest $1M Each in the Internet, Corporate Finance (Dialog 01519069 01-70057), dated Jul. 11, 1997, from url/wysiwyg://0/http://www.dialogclassic.com/history.html (3 pp).

Hyam, Tim, Virtual Trading Becomes a Reality, Global Investor (Dialog 01351071 00-02058), dated Nov. 1996, from. url/wysiwyg://0/http://www.dialogclassic.com/history.html (10 pp).

Anonymous, Systems Spell Change for Foreign Exchange, Global Investor (Dialog 01351072 00-02059), dated Nov. 1996, from. url//http://www.dialogclassic.com/main.vmgw (2 pp).

Cooke, Stephanie, Will Brokers Go Broke?, Euromoney (Dialog 01225374 98-74769), dated May 1996, from. url//http://www.dialogclassic.com/main.vmgw (6 pp).

Roland Woerner; Stephanie Becker; and Marsha Collier, eBay for Dummies, Copyright 1999 IDG Books Worldwide, Inc., pp. 133-135 (5 pp).

Laura Fisher Kaiser & Michael Kaiser, The Official eBay Guide to Buying, Selling, and Collecting Just About Anything; Copyright 1999 by eBay Inc., p. 144; (3 pp).

Michael Miller, The Complete Idiot's Guide to Online Auctions; Copyright 1999 by Que, p. 186; (3pages).

Curt Degenhart & Jen Muehlbauer, AOL in a Nutshell, A Desktop Guide to America Online; Copyright 1998 O'Reilly & Associates, Inc, pp. 73-74; (4 pages).

* cited by examiner

AEFX USER DEFAULTS

| Submit | Willingness To Quote | Willingness To Trade | Menu |
| 1 <Go> | 2 <Go> | 3 <Go> | |

```
        Firm  CHASE MANHATTAN BANK
       Group  CHASE MANHATTAN BANK
Credit rating  AAA
    Location  BAN
     Country  THAILAND
Country of origin  Unknown Origin
        UUID  433230
London rules  N
Show index numbers  Y
Credit filter  BBB
Amount filter  0xDefault  ← 54
```

AEFX

FIG. 3

<HELP> for explanation.                                    DG61 a Govt  AEFX

AEFX USER DEFAULTS

| Submit  | Willingness To Quote | Willingness To Trade | Menu |
| 1 <Go>  | 2 <Go>               | 3 <Go>               |      |

```
           Name
           Firm CHASE MANHATTAN BANK
          Group CHASE MANHATTAN CORP
  Credit rating AA
       Location PAR
        Country FRANCE
Country of origin USA London rules  [N]
Show index numbers [Y]
```

AEFX WILLINGNESS TO TRADE

AEFX

1) Edit Current Firm Restrictions
2) Edit Group Restrictions
3) Edit Country Restrictions
4) Edit Country of Origin Restrictions
5) Edit Existing Firm Exceptions 6) Add Firm Restrictions
7) Add Group Restrictions
8) Add Country Restrictions
9) Add Country of Origin Restrictions
10) Add Firm Exceptions Menu

FIG. 6

AEFX EXISITNG COUNTRY RESTRICTIONS        AEFX

| Submit | Menu |
| 1 <Go> | |

Page 1/ 1

Place an X in the field to remove a restriction

AD, ANDORRA
CU, CUBA
FI, FINLAND
GG, GUERNSEY
         └─ 62
☐☐☐☐☐☐☐☐☐☐☐☐☐☐☐☐

FIG. 7

AEFX EXISTING FIRM RESTRICTIONS                Page 1/ 1        AEFX

| Submit | Menu |
| 1 <Go> | |

Place an X in the field to remove a restriction

A-J STEVENS, HKG
ABB TREASURY CENTRE (UK) PLC, LON
AGRICULTURAL BANK OF CHINA, HKG
AGRICULTURAL BANK OF CHINA, SIN
ALLIED IRISH BANKS PLC, DBN
ALLIED IRISH BANKS PLC, SIN
ALLIED IRISH BANKS PLC (GRP TSY), LON
                                    ⌒64

FIG. 8

```
AEFX ADD COUNTRY RESTRICTIONS                    AEFX

Submit       Menu                        Page   1/   6
1 <Go>

Place an X in the field to add a restriction
 AD, ANDORRA
 AE, UNITED ARAB EMIRATES
 AN, NETHERLANDS ANTILLES
 AR, ARGENTINA
 AT, AUSTRIA
 AU, AUSTRALIA
 AW, ARUBA
 BB, BARBADOS
 BE, BELGIUM
 BG, BULGARIA
 BH, BAHRAIN
 BM, BERMUDA
 BR, BRAZIL
 BS, BAHAMAS
 CA, CANADA
```

FIG. 9

| Submit | Menu | | AEFX ADD FIRM RESTRICTIONS | AEFX |
|---|---|---|---|---|
| 1 <GO> | | | Page 1/ 176 | |

Place an X in the field to add a restriction

☐ A-J STEVENS, HKG
☐ ABB TREASURY CENTRE (UK) PLC, LON
☐ ABBEY NATIONAL FINANCIAL PRODUCT, LON
☐ ABBEY NATIONAL TREASURY SERVICES, LON
☐ ABC INTERNATIONAL BANK PLC, LON
☐ ABN AMRO (MAGYAR) BANK RT, BUD
☐ ABN AMRO AUSTRALIA LTD, SYD
☐ ABN AMRO BANK, BAN
☐ ABN AMRO BANK, JAK
☐ ABN AMRO BANK (DEUTSCHLAND) AG, FFT
☐ ABN AMRO BANK (DEUTSCHLAND) AG, HAM
☐ ABN AMRO BANK (OESTERREICH), VIE
☐ ABN AMRO BANK (POLSKA) SA, WAR
☐ ABN AMRO BANK (SWZ) AG, ZCH
☐ ABN AMRO BANK BHD, KUA

FIG. 10

<HELP> for explanation.                    DG61 a Govt    AEFX

FX SWAP ORDER EDIT

| Submit | Delete | Hold | Menu |
| 1 <Go> | 2 <Go> | 3 <Go> | |

XEUXUS SPOT 5M

Current Price    Input Price              Quantity              Period

Bid        108                                    Near    20  M  XEU   SPOT  12/20/99
Ask    108.200         108.200          Far         M              5M    5/22/00
Spot    1.0379                           As Near     N
                                         All or Nothing Price Increment    0.1

Identifier    10,486         12/16/99 State    Open

FIG. 11

<HELP> for explanation.                                    DG61 a Govt   AEFX

FX SWAP MY ORDER

| Submit | Reject Credit | Insufficient Credit | Menu |
| 1 <Go> | 2 <Go>        | 3 <Go>              |      |

XEUXUS SPOT 5M

```
                       Ask     108.200   SPOT   12/20/99
                                          5M     5/22/00
```

My Terms
```
Near            20 M XEU
           As Near M
Final Spot      1.0379
```

Accept Amount  [Y]

Accept Spot    [Y]

Spot Increment  0.0001

FFT AA        COMMERZBANK
```
Near                20 M XEU
Far            As Near M  0
Final Spot
```

Identifier  10,486   12/16/99 State   Hit-at-Maker

FIG. 12

FX SWAP MY HIT                                AEFX

Submit     Delete
1 <Go>     2 <Go>

GBPUSD SPOT 1M

Bid    -4.99    SPOT    9/24/99
                         1M      10/25/99

Counterparty  PAR A
                                         Near         40 M GBP
                                         Far          As Near M MY Terms
Near    40 M GBP
Far     As Near M Identifier    6,005,260   9/22/99   State   Open

FIG. 13

<HELP> for explanation.                    DG61 a Govt    AEFX

FX SWAP MY HIT

Submit   Menu
1 <GO>

XEUXUS SPOT 5M

Ask      108.200   SPOT   12/20/99
                                   5M    5/22/00

Counterparty
                                              Near         20 M XEU
                                              Far    As Near M My Terms
Near    20 M XEU
Far   As Near M Identifier   10,486    12/16/99 State   Open

FIG. 14

AEFX

FX SWAP MY ORDER

| Submit | Delete | Reject Credit |
|--------|--------|---------------|
| 1 <Go> | 2 <Go> | 3 <Go> |

EURUSD SPOT 3M

Ask    62.90  SPOT  9/24/99
                     3M   12/24/99

My Terms

| | | 20 M EUR |
|---|---|---|
| Near | As Near M | |
| Far | | 0 |
| Final Spot | | |

LON AAA  BANK-C

| | | 20 M EUR |
|---|---|---|
| Near | As Near M | |
| Far | | 1.0352 |
| Final Spot | | |

Accept Amount  [Y]~72
Accept Spot    [N]~72
Spot Increment
       0.0001

Identifier  6,004,590  9/22/99  State  Hit-at-Maker

FIG. 15

AEFX

99)Options    FX SWAP MARKET MONITOR   V2.3   Page 1/2

| | 2)EURUSD | | 3)GBPUSD | | 4)USDJPY | |
|---|---|---|---|---|---|---|
| | 1.0824 1.0829 | | 1.6708 1.6711 | | 105.61 105.70 | |
| T/N | 10) B 0.89 EU100M+ | 20) B 0.91 EU100M | 30) 0.08 | 40) 0.11 | 50) B -1.35 $150M | 60) -1.42 $150M B | T/N |
| 1W | 11) B 5.885 EU 1Y+ | 21) B 5.935 EU100M | 31) 6 | 41) 6.10 | 51) B 200.00 $ 1M | 61) -11.865 $ 1M B | 1W |
| 1M | 12) B 26.00 EU 50M> | 22) B 25.75 EU150M+> | 32) 3.85 | 42) 4.25 | 52) B 200.00 $ 25M | 62) -49.14 $ 25M B | 1M |
| 2M | 13) B 46.737 EU500M+ | 23) B 46.938 EU 50M+ | 33) 2.10 | 43) 2.60 | 53) -96.40 $ 1M B | 63) -96.234 $ 1M B | 2M |
| 3M | 14) B 76.10 EU 50M+ | 24) B 76.30 EU 50M | 34) 12.800 £ 1M B | 44) 24.611 £ 1M B | 54) B -160.60 $150M | 64) -159.20 $175M B | 3M |
| 4M | 15) B 100.000 EU 30M> | 25) B 99.725 EU 30M+ | 35) 10.60 £ 50M AA | 45) 12.00 £ 50M+ AA | 55) B 200.00 $ 1M | 65) -211.50 $ 1M B | 4M |
| 5M | 16) B 90.00 EU 30M> | 26) B 89.70 EU 30M+ | 36) 8.750 £ 1M B | 46) 9.555 £ 1M B | 56) -258.25 $ 1M B | 66) -257.25 $ 1M B | 5M |
| 6M | 17) B 154.30 EU 30M+ | 27) B 219.59 EU 30M>b B | 37) 6.950 £ 25M AAA | 47) 8.455 £ 25M+> AAA | 57) -309.25 $ 1M B | 67) -308.25 $ 1M B | 6M |
| 9M | 18) B 203.75 EU 30M | 28) B 205.70 EU 30M> | 38) -8.500 £ 1M B | 48) -6.555 £ 1M B | 58) -461.50 $ 1M B | 68) -460.50 $ 1M B | 9M |
| 12M | 19) B 266.20 EU500M> | 29) B 266.40 EU 30M+ B | 39) -9.28 | 49) -6.28 | 59) -622.00 $ 75M B | 69) -620.00 $ 75M B | 12M |

| <HELP> for explanation. | | | | | | DG61 a Govt AEFX | | |
|---|---|---|---|---|---|---|---|---|
| Tullett & Tokyo Limited | | | | | | | | |
| 99)Options | FX SWAP MARKET MONITOR V2.62 Page 1/2 | | | | | | | |
| Read Only | 2)EURUSD 1.0155 1.0160 | | 3)XGBPUSD 1.6118 1.6125 | | 4)USDJPY 103.01 103.11 | | | |
| T/N | 10) 2.01 | 20) 2.04 | 30) 0.06 | 40) 0.08 | 50) -4.55 | 60) -4.52 ¥ 10Y> AA | | T/N |
| 1W | 11) 4.97 | 21) 5.02 | 31) 0.72 | 41) 0.77 | 51) -10.80 | 61) -10.70 | | 1W |
| 1M | 12) 25 | Trade Action 80)Order One - Input order this side 81)Order Both - Input bid & ask order 82)Quote One - Request quote this side 83)Quote Both - Request bid & ask quote 84)Hold all within same instrument 85)Release all within same instrument Change Monitors 86)Market Monitor 87)Depth Monitor 88)Action Monitor 89)Single Market Monitor 90)Quote Monitor 91)Defaults 92)Menu | | | | 62) -50.30 | | 1M |
| 2M | 13) 49 | | | | | 63) -103.90 | | 2M |
| 3M | 14) 92 | | | | | 64) -149.50 | | 3M |
| 4M | 15) 92 | | | | | 65) -198.75 | | 4M |
| 5M | 16) 114 | | | | | 66) -251.25 | | 5M |
| 6M | 17) 135 | | | | | 67) -297.00 $ 50M A | | 6M |
| 9M | 18) 197 | | | | | 68) -453 | | 9M |
| 12M | 19) 258 | 29) 259 | 39) -22 | 49) -21 | 59) -607.50 | 69) -604.50 | | 12M |

99)Options FX SWAP SINGLE MARKET MONITOR                    AEFX
                 2)EURUSD          3)Filter Off
           1.0349      1.0355

| | | | | Period | Bid | Ask | | | |
|---|---|---|---|---|---|---|---|---|---|
| 10) | | | | | | | 30) | | |
| 11) | EU 1M | AAA | EU 1M | O/N | 0.66 | 0.68 | 31) | | |
| 12) | | | | T/N | 0.68 | 0.69 | 32) | EU 1M | AAA | EU 1M |
| 13) | EU 10M | AAA | EU 10M | S/N | 2.05 | 2.10 | 33) | | |
| 14) | | | | 1W | 4.74 | 4.78 | 34) | EU 10M | AAA | EU 10M |
| 15) | | | | 2W | 9.43 | 9.50 | 35) | | |
| 16) | EU 20M | AAA | EU 20M | 3W | 14.20 | 14.30 | 36) | | |
| 17) | EU 20M | AAA | EU 20M | 1M | 18.95 | 19.00 | 37) | EU 50M > | AA | EU 70M |
| 18) | EU100M | AA | EU 20M+> | 2M | 41.60 | 41.23 | 38) | EU 67M > | AA | EU145M |
| 19) | EU 90M | AA | EU 50M > | 3M | 62.80 | 62.80 | 39) | EU 20M+ | AA | EU 70M |
| 20) | EU 20M | AAA | EU 20M | 4M | 85.35 | 85.60 | 40) | EU 20M | AAA | EU 20M |
| 21) | EU115M | AAA | EU 20M > | 5M | 106.75 | 106.80 | 41) | EU 22M > | AA | EU 82M |
| 22) | | | | 6M | 128.32 | 128.70 | 42) | EU 20M > | AAA | EU175M |
| 23) | | | | 7M | 152.20 | 153.00 | 43) | | |
| 24) | EU 60M | AA | EU 40M > | 8M | 175.00 | 176.00 | 44) | | |
| 25) | | | | 9M | 199.60 | 200.50 | 45) | EU 20M | AAA | EU 20M |
| 26) | | | | 10M | 222.00 | 223.00 | 46) | | |
| 27) | EU 20M | AAA | EU 20M | 11M | 245.50 | 246.50 | 47) | | |
| 28) | | | | 12M | 267.50 | 269.00 | 48) | EU 20M | AAA | EU 20M |
| 29) | | | | 18M | 415.00 | 420.00 | 49) | | |
| | | | | 24M | 568.00 | 570.00 | | | |

| 99)Options | | | FX SWAP DEPTH MONITOR | | | | AEFX |
|---|---|---|---|---|---|---|---|
| | | | EURUSD SPOT 1M | | | | Page 1/ 1 |
| Sum MMaker | CCY | Size | 1.0349 | 18.95 | 1.0355 | Size CCY | MMaker Sum |
| | | | | 5) | 19 | 50M EUR | AA 50M |
| | | | | 6) | 19.05 | 20M EUR | AAA 20M |
| 4) 20M AAA | EUR | 20M | | | | | |

FIG. 19

FX Market Depth Monitor

Filter On/Off/Change

DEM/USD 1M

| Sum | MMaker | Flag | CCY | Size | 1.6892 | 1.6892 | Size | CCY | Flag | MMaker | Sum |
|---|---|---|---|---|---|---|---|---|---|---|---|
| 200M | AA | LDN | DEM | 200M | -12 | -6 | 60M | DEM | | AA- LDN | 60M |
| 220M | BBB+NYC | | USD | 20M | -12 | -7 | 80M | DEM | | OWN | 140M |
| 240M | AAA+NYC | BSO | DEM | 20M | -13 | | 20M | DEM | BSO | AAA+LDN | 260M |

01/28/99 200M
04/28/99 220M
Back  ← 92

Edit
Hold
Delete
Quote:Single
Quote:Both
Order:Single
Order:Both
Market
Action
Defaults
Function
Back  ← 90

Hit
Quote:Single
Quote:Both
Order:Single
Order:Both
Market
Action
Defaults
Function
Back  ← 88

← 86

Page Fwd: Next Period                 Page Back: Previous Period

FIG. 20

FX SWAP REQUEST FOR QUOTE

Submit    Menu
1 <Go>

GBPUSD SPOT 9M

Page    1/    1

Quote Bid
Quantity           Period

| Near | 1 | M | GBP |   | SPOT | 11/26/99 |
| Far | As Near | M |   |   | 9M | 8/29/00 |

104   104                                106

Choose up to 8 firms to request quote
4 firms are willing to provide quotes

NATIONAL WESTMINSTER
BARCLAYS BANK PLC
AIB GROUP
TULLETT & TOKYO FORE
108

AEFX

FIG. 22

<HELP> for explanation.    DG61 a Govt    AEFX

FX SWAP REQUEST FOR QUOTE

| Submit | Menu |
| 1 <GO> | |

Page 1/ 1

XEUXUS SPOT 3M

Quote Ask

Quantity        Period

Near  [30] [M] [XEU]   [SPOT] [12/20/99]
Far   [As Near] [M]    [3M]   [3/20/00]

Choose up to 8 firms to request quote
12 firms are willing to provide quotes

[X] CHASE MANHATTAN BANK
[ ] UBS AG.
[ ] CHINA STATE BANK LTD
[ ] DAH SING BANK LTD
[ ] TULLETT & TOKYO LOND

[ ] DEUTSCHE BANK AG
[ ] CHINA STATE BANK LTD
[ ] CHINA STATE BANK LTD
[ ] FLEET NATIONAL BANK
[ ] ABN AMRO BANK NV
[ ] DAH SING BANK LTD
[ ] DAH SING BANK LTD

FIG. 23

<HELP> for explanation.                                    DG61 a Govt    AEFX

FX SWAP QUOTE PROVIDE

| Submit | Pass |   | Menu |
|--------|------|---|------|
| 1 <Go> | 2 <Go> | | |

XEUXUS SPOT 3M

Current Price        Input Price                Quantity              Period

Bid    73.075        [73.575]          Near    30 M XEU       SPOT  12/20/99
Ask    73.275                          Far     As Near M       3M    3/20/00

Price Increment  [0.1]

Requester AA     FFT COMMERZBANK

Identifier   10,496     12/16/99 State   Quote-at-Provider

FIG. 24

```
                                         A E F X
             F X  S W A P  Q U O T E  M O N I T O R    Page 1/1
99)Options
2)Wait-3              EURUSD SPOT 3W   EUR 10M   BANK-T
3)Wait-3              EURUSD SPOT 3W   EUR 10M   BANK-T
4)Wait-3              EURUSD SPOT 3W   EUR 10M   BARCLAYS BAN
5)Wait-3              EURUSD SPOT 3W   EUR 10M   BANK-C
6)Wait-3              EURUSD SPOT 3W   EUR 10M   BANK-G
7)Act -3     14.20    EURUSD SPOT 3W   EUR 10M   BANK-T
8)Act -3     14.30 Order EURUSD SPOT 3W EUR 10M  BANK-B
```

FIG. 25

<HELP> for explanation.
Tullett & Tokyo Limited          DG61 a Govt  AEFX
99)Options    FX SWAP MARKET MONITOR   V2.62 Page 1/2

| Read Only | 2)EURUSD | | 3)XGBXUS | | 4)USDJPY | |
|---|---|---|---|---|---|---|
| | 1.0155 | 1.0160 | 1.6118 | 1.6125 | 103.01 | 103.11 |
| T/N | 10) 2.01 | 20) 2.04 | 30) 0.06 | 40) 0.08 | 50) -4.55 | 60) -4.52 AA T/N |
| | 11) Trade Action | | | | 51) -10.80 | 61) -10.70 ¥ 10Y> 1W |
| 1W | 80)Execute/View | | | | | |
| 1M | 81)Order One - Input order this side | | | | 52) -50.60 | 62) -50.30 1M |
| | 82)Order Both - Input bid & ask order | | | | | |
| 2M | 83)Quote One - Request quote this side | | | | 53) -104.40 | 63) -103.90 2M |
| | 84)Quote Both - Request bid & ask quote | | | | | |
| 3M | 85)Hold all within same instrument | | | | 54) -150 | 64) -149.50 3M |
| | 86)Release all within same instrument | | | | | |
| 4M | Change Monitors | | | | 55) -199.75 | 65) -198.75 4M |
| | 87)Market Monitor | | | | | |
| 5M | 88)Depth Monitor | | | | 56) -252.25 | 66) -251.25 5M |
| | 89)Action Monitor | | | | | |
| 6M | 90)Single Market Monitor | | | | 57) -299.50 | 67) -297.00 6M |
| | 91)Quote Monitor | | | | | $ 50M A |
| 9M | 92)Defaults | | | | 58) -455 | 68) -453 9M |
| | 93)Menu | | | | | |
| 12M | 19) 258 | 29) 259 | 39) -22 | 49) -21 | 59) -607.50 | 69) -604.50 12M |

FIG. 26

<HELP> for explanation.　　　　　　　　　　　　　DG61 a Govt　AEFX
Tullett & Tokyo Limited
99)Options　　FX SWAP MARKET MONITOR　V2.62 Page 1/2

| Read Only | 2)XUSXJP | | 3)XGBXUS | | 4)USDJPY | | | |
|---|---|---|---|---|---|---|---|---|
| | 106.50 106.55 | | 1.6118 1.6125 | | 103.01 103.11 | | | |
| T/N | 10) -3.24 20) -3.22 | 30) | 0.06 40) 0.08 | 50) | -4.55 | 60) -4.52 | AA | T/N |
| | | | | | | ¥ 10Y> | | |
| 1W | 11) AA | Trade Action | | 51) | -10.80 | 61) -10.70 | | 1W |
| | | 80)Edit | | | | | | |
| 1M | 12) | 81)Hold | | 52) | -50.60 | 62) -50.30 | | 1M |
| | | 82)Off | | | | | | |
| | | 83)Order One - Input order this side | | | | | | |
| 2M | 13) | 84)Order Both - Input bid & ask order | | 53) | -104.40 | 63) -103.90 | | 2M |
| | | 85)Quote One - Request quote this side | | | | | | |
| 3M | 14) | 86)Quote Both - Request bid & ask order | | 54) | -150 | 64) -149.50 | | 3M |
| | − | 87)Hold all within same instrument | | | | | | |
| 4M | 15) | 88)Release all within same instrument | | 55) | -199.75 | 65) -198.75 | | 4M |
| | | Change Monitors | | | | | | |
| 5M | 16) | 89)Market Monitor | | 56) | -252.25 | 66) -251.25 | | 5M |
| | Own − | 90)Depth Monitor | | | | | | |
| 6M | 17) | 91)Action Monitor | | 57) | -299.50 | 67) -297.00 | A | 6M |
| | | 92)Single Market Monitor | | | | $ 50M | | |
| 9M | 18) | 93)Quote Monitor | | 58) | -455 | 68) -453 | | 9M |
| | | 94)Defaults | | | | | | |
| 12M | 19) | 95)Menu | | 59) | -607.50 | 69) -604.50 | | 12M |

FIG. 27

```
<HELP> for explanation.                                    DG61 a Govt    AEFX
Your Order/Hit Action Is Required (AEFX).
99)Options            F X   S W A P   M A R K E T   M O N I T O R    V2.62 Page 1/2
```

| Read Only | 2)XEUXUS | | 3)GBPUSD | | 4)USDJPY | | AA T/N |
|---|---|---|---|---|---|---|---|
| | 1.0376 | 1.0381 | 1.6081 | 1.6089 | 103.01 | 103.11 | |
| T/N | 10) 0.71 | 20) 0.73 | 30) 0.47 | 40) 0.55 | 50) -4.55 | 60) -4.52 | ¥ 10Y> |
| 1W | 11) 4.65 | 21) 4.70 | 31) 2.75 | 41) 3 | 51) -10.80 | 61) -10.70 | 1W |
| 1M | 12) 25.90 | 22) 24.90 | 32) 10.70 | 42) 11 | 52) -50.50 | 62) -50.20 | 1M |
| 2M | 13) 49.24 | 23) 49.30 | 33) 9.80 | 43) 10.20 | 53) -104.30 | 63) -103.80 | 2M |
| 3M | 14) 73.08 | 24) 73.28 | 34) 8.60 | 44) 9.10 | 54) -150 | 64) -149.50 | 3M |
| 4M | 15) 101.75 | 25) 101.76 | 35) 6.75 | 45) 7.50 | 55) -199.50 | 65) -198.50 | 4M |
| 5M | 16) 108 | 26) 108.20 | 36) 5.25 | 46) 6 | 56) -252 | 66) -251 | 5M |
| 6M | 17) 145.45 | 27) 145.25 | 37) 2.50 | 47) 3.50 | 57) -299.25 | 67) -297.00 | 6M |
| | | | | | | $ 50M A | |
| 9M | 18) 196 | 28) 197 | 38) -5 | 48) -3 | 58) -454 | 68) -452 | 9M |
| 12M | 19) 257 | 29) 258 | 39) -14 | 49) -12 | 59) -606.50 | 69) -603.50 | 12M |

```
<HELP> for explanation.                    DG61 a Govt    AEFX
Tullett & Tokyo Limited                                  AEFX
       FX SWAP ACTION MONITOR            Page 1/1
99)Options     Responses to My Quote Request
```

| | | Quotes Required/Made | |
|---|---|---|---|
| | | Active Hits | |
| 9)Act 70 | Order | 108.20 XEUXUS SPOT 5M XEU 20M 1.0379 COMMERZBANK | |
| | | Orders | |

FIG. 29

```
<HELP> for explanation.                    DG61 a Govt    AEFX
Tullett & Tokyo Limited
99)Options    FX SWAP ACTION MONITOR        Page 1/1
              Responses to My Quote Request
```

Quotes Required/Made

Active Hits

| | | | |
|---|---|---|---|
| XEU | 20M | 1.0379 | COMMERZBANK |

9)) Trade Action
   80) Accept
   81) View
   82) Reject credit & add firm restriction
   83) Insufficient credit for this trade
   84) Hold all within same instrument
   85) Release all within same instrument
   Change Monitors
   86) Market Monitor
   87) Depth Monitor
   88) Action Monitor
   89) Single Market Monitor
   90) Quote Monitor
   91) Defaults
   92) Menu

(rotated 90°):

```
<HELP> for explanation.                    DG61 a Govt    AEFX
Tullett & Tokyo Limited
99)Options    FX SWAP ACTION MONITOR        Page 1/1
              Responses to My Quote Request Quotes Required/Made

XEU   20M   1.0379  CHASE MANHAT

Trade Action
9)A  80)Accept
     81)View
     82)Hold all within same instrument
     83)Release all within same instrument
        Change Monitors
     84)Market Monitor
     85)Depth Monitor
15)  86)Action Monitor
16)  87)Single Market Monitor
     88)Quote Monitor
     89)Defaults
     90)Menu
```

<HELP> for explanation.

FX SWAP MY HIT                     DG61 a Govt   AEFX

| Submit | Reject Credit | Insufficient |  | Enter Spot |
| 1 <Go> | 2 <Go> | 3 <Go> |  | Current Spot  1.0375 |

XEUXUS SPOT 5M

| 1) | 10) 1.0374 | 20) 1.0376 |
| 2) | 11) 1.0373 | 21) 1.0377 |
|    | 12) 1.0372 | 22) 1.0378 |
| Ask  108.200  SP | 13) 1.0371 | 23) 1.0379 |
|    | 14) 1.0370 | 24) 1.0380 |
|    | 15) 1.0369 | 25) 1.0381 |
|    | 16) 1.0368 | 26) 1.0382 |
|    | 17) 1.0367 | 27) 1.0383 |
|    | 18) 1.0366 | 28) 1.0384 |
|    | 19) 1.0365 | 29) 1.0385 |

Accept Amount [Y]

Accept Spot [N]

My Terms
| Near      | 20 M XEU |
| Far       | As Near M |
| Final Spot | 1.0375  |

Far         As Near M
Final Spot  1.0379

Spot Increment  0.0001

Identifier  10,486    12/16/99 State  Hit-at-Hitter

FIG. 32

<HELP> for explanation.　　　　　　　　　　　　　　DG61 a Govt　　AEFX
Your Order/Hit Action Is Required (AEFX).
　　　　FX SWAP ACTION MONITOR　　　Page 1/1
99)Options　　Responses to My Quote Request

112

| | Quotes Required/Made | | |
|---|---|---|---|
| | Active Hits | | |
| 9)Act 85 | Order | 108.20 | XEUXUS SPOT 5M　XEU　20M　1.0375 COMMERZBANK |
| | Orders | | |

FIG. 33

<HELP> for explanation.

DG61 a Govt    AEFX

FX SWAP MY ORDER

| Submit | Menu |
|--------|------|
| 1 <Go> |      |

XEUXUS SPOT 5M

| | | |
|---|---|---|
| Ask | 108.200 SPOT | 12/20/99 |
| | 5M | 5/22/00 |

| For Beta Testing Only | |
|---|---|
| Order_Status | 35 |
| Hit_Status | 14 |
| Hit_Amount_Neg | 221 |
| Hit_Spot_Neg | 2 |

My Terms

| Near | 20 M XEU | |
|---|---|---|
| Far | As Near M | |
| Final Spot | 1.0375 | |

Accept Amount [Y]

Accept Spot [Y]

Spot Increment [0.0001]

FFT AA    COMMERZBANK

| Near | 20 M XEU |
|---|---|
| Far | As Near M |
| Final Spot | 1.0375 |

Identifier 10,486    12/16/99 State Hit-at-Maker

FIG. 34

```
<HELP> for explanation.                              DG61 a Govt    AEFX
Cleared AEFX Message.
99)Options       Fx   SWAP ACTION MONITOR       Page  1/1
                      Responses to My Quote Request
```

| | Quotes Required/Made | |
|---|---|---|
| | | |

Active Hits

| 9)Done | Order | 108.20 | XEUXUS SPOT 5M | XEU 20M | 1.0375 COMMERZBANK |
|---|---|---|---|---|---|

Orders

FIG. 35

<HELP> for explanation.                                      DG61 a Govt    AEFX

FX SWAP TRADE

Menu

XEUXUS SPOT 5M

| Price | | Quantity | | Period | |
|---|---|---|---|---|---|
| Ask | 108.200 | Near | 20 M XEU | SPOT | 12/20/99 |
| Final Spot | 1.0375 | Far | As Near M | 5M | 5/22/00 |
| X Rate | 1.0483200 | | | | |

Cash Flows

| CHASE MANHAT PAR | | COMMERZBANK | FFT |
|---|---|---|---|
| 20,000,000.00 | XEU 12/20/99 | XUS (20,750,000.00) | |
| (20,000,000.00) | XEU 5/22/00 | XUS 20,966,400.00 | |

Identifier  10,486    12/16/99 State  Done

FIG. 36

| <HELP> for explanation. | | | | | | DG61 a Govt AEFX | |
|---|---|---|---|---|---|---|---|
| 99)Options | | | | | | V2.62 Page 1/2 | |
| Tullett & Tokyo Limited FX SWAP MARKET MONITOR | | | | | | | |
| Read Only | 2)XEUXUS 1.0376 1.0381 | | 3)GBPUSD 1.6081 1.6089 | | 4)USDJPY 103.01 103.11 | | |
| T/N | 10) 0.71 | 20) 0.73 | 30) 0.47 | 40) 0.55 | 50) -4.55 | 60) -4.52 ¥ 10Y> | AA T/N |
| 1W | 11) 4.65 | 21) 4.70 | 31) 2.75 | 41) 3 | 51) -10.80 | 61) -10.70 | 1W |
| 1M | 12) 25 | | | Trade Action | | 62) -50.20 | 1M |
| 2M | 13) 49 | | | 80)Order One - Input order this side | | 63) -103.80 | 2M |
| 3M | 14) 73 | | | 81)Order Both - Input bid & ask order 82)Quote One - Request quote this side | | 64) -149.50 | 3M |
| 4M | 15) 101 | | | 83)Quote Both - Request bid & ask quote 84)Hold all within same instrument | | 65) -198.50 | 4M |
| 5M | 16) | | | 85)Release all within same instrument Change Monitors | | 66) -251 | 5M |
| 6M | 17) 145 | | | 86)Market Monitor 87)Depth Monitor | | 67) -297.00 $ 50M A | 6M |
| 9M | 18) | | | 88)Action Monitor 89)Single Market Monitor | | 68) -452 | 9M |
| 12M | 19) 257 | 29) 258 | 39) | 90)Quote Monitor 91)Defaults 92)Menu | 59) -606.50 | 69) -603.50 | 12M |

FIG. 37

|  |  |  |  |
|---|---|---|---|
| <HELP> for explanation. DG61 a Govt AEFX |
| Your Quote Action Is Required (AEFX). |
| FX SWAP ACTION MONITOR Page 1/1 |
| 99)Options Responses to My Quote Request |

| Quotes Required/Made | | | |
|---|---|---|---|
| XEUXUS SPOT 3M | XEU | 30M | COMMERZBANK |
| Active Hits | | | |
| 6)Act 84 | | | |

| Orders |
|---|
|  |
|  |

<HELP> for explanation.                           DG61 a Govt    AEFX
Tullett & Tokyo Limited
99)Options    FX SWAP MARKET MONITOR      Page 1/1
              Responses to My Quote Request

25) XEUXUS  SPOT  3M  XEU  30M

Quotes Required/Made

Active Hits

Orders
15) Live  -12.52   Order    XUSXJP  SPOT  1W   XUS  1M
16) Live  Order    -90.225  XUSXJP  SPOT  2M   XUS  2M

FIG. 39

```
<HELP> for explanation.                                          DG61 a Govt   AEFX
Cleared AEFX Message.
99)Options         FX  SWAP ACTION MONITOR                   Page 1/1
                        Responses to My Quote Request 4) 73.575 25) XEUXUS SPOT 3M  XEU  30M Trade Action
                              80)Quote off         —116
                              81)Menu
                                         Active Hits Orders
        -12.52    Order     XUSXJP   SPOT  1W   XUS   1M
        Order     -90.225   XUSXJP   SPOT  2M   XUS   2M 15)Live
        16)Live
```

FIG. 41

<HELP> for explanation.　　　　　　　　　　　　　　　DG61 a Govt  AEFX
Tullett & Tokyo Limited
99)Options　　FX SWAP ACTION MONITOR　　Page 1/1
　　　　　　　　Responses to My Quote Request (4) 73.575 (25) XEUXUS SPOT 3M    XEU    30M Quotes Required/Made Trade Action
80) Execute/View
81) Order One  - Input order this side
82) Order Both - Input bid & ask order
83) Quote One  - Request quote this side
84) Quote Both - Request bid & ask quote
85) Hold all within same instrument
86) Release all within same instrument
　　Change Monitors
87) Market Monitor
88) Depth Monitor
89) Action Monitor
90) Single Market Monitor
91) Quote Monitor
92) Defaults
93) Menu

FIG. 42

<HELP> for explanation.                    DG61 a Govt    AEFX

FX SWAP QUOTE HIT

```
Hit   Menu
1 <Go>
```

XEUXUS SPOT 3M

| Price | | Quantity | | Period | |
|---|---|---|---|---|---|
| Ask | 73.575 | Near | 30 M XEU | SPOT | 12/20/99 |
| | | Far | As Near M | 3M | 3/20/00 |

| Requester | Provider | |
|---|---|---|
| COMMERZBANK | FFT AA | CHASE MANHAT | PAR AA |

Identifier 10,496    12/16/99 State   Quote-at-Register

FIG. 43

```
<HELP> for explanation.                          DG61 a Govt   AEFX
Cleared AEFX Message.
99)Options    FX    SWAP ACTION MONITOR         Page 1/1
                    Responses to My Quote Request
```

| | Quotes Required/Made | | |
|---|---|---|---|
| | Active Hits | | |
| 9)Act 85 | Quote  73.575 | XEUXUS SPOT 3M  XEU 30M  1.0379 COMMERZBANK | |
| | Orders | | |

FIG. 44

<HELP> for explanation.                                    DG61 a Govt    AEFX
Tullett & Tokyo Limited
99)Options        FX SWAP ACTION MONITOR                   Page 1/1
                  Responses to My Quote Request Quotes Required/Made Active Hits

| 9)Wait 79 | Request | 73.575 | XEUXUS SPOT 3M | XEU 30M | 1.0379 CHASE MANHAT |

Orders

| 15)Live | -12.52 Order | Order -90.225 | XUSXJP SPOT 1W | XUS 1M | |
| 16)Live | | | XUSXJP SPOT 2M | XUS 2M | |

FIG. 45

```
<HELP> for explanation.                              DG61 a Govt    A E F X
Screen Printed
99)Options           F X   S W A P   A C T I O N   M O N I T O R    Page 1/1
                              Responses to My Quote Request
```

|  |  | Quotes Required/Made |  |  |  |
|---|---|---|---|---|---|
|  |  | Active Hits |  |  |  |
| 9)Act 76 | Request | 73.575 | XEUXUS SPOT 3M | XEU 30M | 1.0379 CHASE MANHAT |
|  |  | Orders |  |  |  |
| 15)Live | -12.52 Order | Order  | XUSXJP SPOT 1W | XUS 1M |  |
| 16)Live | Order | -90.225 | XUSXJP SPOT 2M | XUS 2M |  |

FIG. 46

<HELP> for explanation.                     DG61 a Govt    AEFX
Screen Printed          FX SWAP ACTION MONITOR     Page 1/1
99)Options                Responses to My Quote Request Quotes Required/Made

| Trade Action |
|---|
| 80)Accept |
| 81)View |
| 82)Hold all within same instrument |
| 83)Release all within same instrument |
| Change Monitors |
| 84)Market Monitor |
| 85)Depth Monitor |
| 86)Action Monitor |
| 87)Single Market Monitor |
| 88)Quote Monitor |
| 89)Defaults |
| 90)Menu |

9)A    XEU    30M    1.0379    CHASE MANHAT
[15)
[16)

FIG. 47

<HELP> for explanation.   FX SWAP TRADE   DG61 a Govt   AEFX

Menu

XEUXUS SPOT 3M

| Price | | Quantity | | Period | |
|---|---|---|---|---|---|
| Ask | 73.575 | Near | 30 M XEU | SPOT | 12/20/99 |
| Final Spot | 1.0379 | Far | As Near M | 3M | 3/20/00 |
| X Rate | 1.0452575 | | | | |

Cash Flows

CHASE MANHAT PAR                COMMERZBANK
30,000,000.00    XEU 12/20/99 XUS  (31,137,000.00)
(30,000,000.00)  XEU 3/20/00  XUS   31,357,725.00

FFT

Identifier  10,496   12/16/99 State   Done

FIG. 48

SYSTEM AND METHOD FOR IMPLEMENTING FOREIGN EXCHANGE CURRENCY FORWARDS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to currency exchange trading systems, and, more particularly, to a system and method for efficiently conducting forward exchange and currency forwards between interconnected currency trading systems.

Currency brokers and traders engaging in foreign currency exchanges and forwards typically operation with limited knowledge of the counterparties in the transaction. For example, instability in financial markets and fluctuations in exchange rates have made various countries, currencies, and financial institutions greater risks for foreign currency exchanges.

A need exists for an automated currency exchange trading system which increases the information on counterparties, including potential risks, prior to initiating trades.

In addition, the sheer volume of financial information to traders has generally increased, such that traders may spend inordinate time selecting among counterparties and orders which may include excessive risk.

A need exists for an automated currency exchange trading system which blocks the display of selected counterparties and orders having excessive risk levels.

SUMMARY OF THE INVENTION

An object of the present invention is to provide an automated currency exchange trading system which increases the information on counterparties, including potential risks, prior to initiating trades.

Another object of the present invention is to provide an automated currency exchange trading system which blocks the display of selected counterparties and orders having excessive risk levels.

A further object of the present invention is to provide a hybrid trading system supporting both telephone-based and/or data-based communications for initiating and completing currency exchange trades.

In achieving the above and other objects the invention provides the following.

A computer system and method support foreign exchange (FX) forward trading for both order posting and execution. The system includes a central server for tracking currency trades; a plurality of trading workstations; and at least one remote server interfacing the trading workstations to the central server, with the at least one remote server mediating the currency trades between traders using the workstations by consulting pre-set trading configurations associated with each trader. Currency brokers and traders use the system through a plurality of data input and display screens to deal in currency forwards in an efficient manner. The system and method support both voice and electronic data to interface with existing trading systems such as voice-based networks, permitting order entry anywhere in the world.

The disclosed system includes features such as the filtering of entities by specified criteria such as bad credit, bad geography, etc. using the pre-set trading configurations associated with each trader, so that such filtered entities are not even displayed to a trader; request for quotes functions, in which up to eight people can be selected and stored in a database who a trader is willing to trade with; and a penalty box for not trading or displaying trades of an annoying trader.

In one embodiment, a system is disclosed which conducts electronic trading of foreign exchange forwards using a central server for tracking currency trades; a plurality of trading workstations; and at least one remote server interfacing the trading workstations to the central server. The at least one remote server mediates the currency trades between traders using the workstations by consulting pre-set trading configurations associated with each trader. The pre-set trading configurations correspond to filter settings for at least one filter criteria; and a first remote server, connected to a first workstation associated with a first trader having associated first filter settings, blocks from view by the first trader any currency trades from other traders not meeting the at least one filter criteria corresponding to the first filter settings.

The at least one filter criteria may include credit rating restrictions. Alternatively, the at least one filter criteria includes geographic restrictions. In another alternative embodiment, the at least one filter criteria includes institution-based restrictions. In still another alternative embodiment, the at least one filter criteria includes trade amount restrictions. In a further alternative embodiment, the at least one filter criteria includes temporary restrictions on a specified trader specified by the first trader.

The pre-set trading configurations associated with each trader includes a database listing a set of traders, stored in a memory of the remote server, with which the first trader is willing to trade; and the remote server responds to a selection by the first trader of a subset of the set of traders, and conveys a request-for-quote transmission from the first trader to the selected subset of traders.

At least one trading workstation is associated with a telephone for providing voice communications between a trader associated therewith and other entities having telephone capabilities; and the trading workstation provides data communications between the trader associated therewith and other entities having data communication capabilities, to provide traders on the system with both voice-based and data-based trading functionality.

In another embodiment, a system is disclosed for conducting electronic trading of foreign exchange forwards, and includes a central server for tracking currency trades; a plurality of trading workstations organized in a plurality of groups for conducting electronic data-based trading, with a portion of the trading workstations associated with respective telephones for conducting voice-based trading; and a plurality of remote servers, each respective remote server being associated with a respective group of trading workstations and interfacing the respective group of trading workstations to the central server, with the remote servers mediating the currency trades between traders using the workstations by consulting pre-set trading configurations associated with each trader corresponding to filter settings for at least one filter criteria; and with a first remote server, connected to a first workstation associated with a first trader having associated first filter settings, blocks from view by the first trader any currency trades from other traders not meeting the at least one filter criteria corresponding to the first filter settings.

A method is also disclosed for conducting electronic trading of foreign exchange forwards, with the method having the steps of: receiving currency trades for foreign exchange forwards from traders using a plurality of trading workstations; tracking the currency trades in a central server; and mediating the currency trades between traders using at least one remote server, including the steps of: interfacing the workstations of respective traders to the central server; consulting pre-set trading configurations associated with each trader; and controlling the distribution of trading information between traders to conduct the currency trades.

In one embodiment, the pre-set trading configurations used in the method correspond to filter settings for at least one filter criteria; and the step of mediating includes the step of: evaluating trades to and from a first workstation utilizing the first filter settings at a first remote server connected to the first workstation associated with a first trader having associated first filter settings; and blocking from view by the first trader any currency trades from other traders not meeting the at least one filter criteria corresponding to the first filter settings.

The at least one filter criteria may include credit rating restrictions. Alternatively, the at least one filter criteria includes geographic restrictions. In another alternative, the at least one filter criteria includes institution-based restrictions. In still another alternative, the at least one filter criteria includes trade amount restrictions. In a further alternative, the at least one filter criteria includes temporary restrictions on a specified trader specified by the first trader.

In the method, the pre-set trading configurations associated with each trader includes a database listing a set of traders, stored in a memory of the remote server, with which the first trader is willing to trade; and the step of mediating at the remote server includes the steps of: receiving at the remote server selections by the first trader of a subset of the set of traders; and conveying a request-for-quote transmission from the first trader to the selected subset of traders.

The method may also include the step of: providing telephones respectively associated with a portion of the workstations for conducting voice communications between a trader associated therewith and other entities having telephone capabilities; and providing data communications between the workstations and the traders associated therewith and other entities having data communication capabilities, thereby providing traders on the system with both voice-based and data-based trading functionality.

The method may also include the steps of: executing graphic user interfaces (GUIs) at each workstation for receiving inputs and for displaying trading information to the traders using the workstations; and providing a plurality of specialized GUI screens for facilitating the electronic trading of foreign exchange forwards, including the step of displaying a first GUI screen for receiving trader inputs to set the respective trading configurations associated with each trader.

In another embodiment of the present invention, a system is provided for conducting electronic trading of foreign exchange forwards, and the system includes a central server for tracking currency trades; a plurality of trading workstations; and at least one remote server interfacing the trading workstations to the central server, with the at least one remote server mediating the currency trades between traders using the workstations by consulting filter settings for at least one filter criteria associated with each trader; and with a first remote server, connected to a first workstation associated with a first trader having associated first filter settings, blocks from view by the first trader any currency trades from other traders not meeting the at least one filter criteria corresponding to the first filter settings.

In this system, the at least one filter criteria may include credit rating restrictions. Alternatively, the at least one filter criteria includes geographic restrictions.

In an alternative embodiment of the present invention, a system is disclosed for conducting electronic trading of foreign exchange forwards, with the system having a central server for tracking currency trades; a plurality of trading workstations; and at least one remote server interfacing the trading workstations to the central server, with the at least one remote server mediates the currency trades between traders using the workstations by consulting at least one filter criteria includes temporary restrictions on a specified trader specified by a first trader to put the specified trader into a penalty box state.

In still another alternative embodiment of the present invention, a system is disclosed for conducting electronic trading of foreign exchange forwards, and the system has a central server for tracking currency trades; a plurality of trading workstations; and at least one remote server interfacing the trading workstations to the central server, with the at least one remote server mediating the currency trades between traders using the workstations using a database listing a set of traders, stored in a memory of the remote server, with which a first trader is willing to trade; and the remote server, responds to a selection by the first trader of a subset of the set of traders, and conveys a request-for-quote transmission from the first trader to the selected subset of traders.

In a further alternative embodiment, a system is disclosed for conducting electronic trading of foreign exchange forwards, and the system has a central server for tracking currency trades; a plurality of trading workstations; and at least one remote server interfacing the trading workstations to the central server, with the at least one remote server mediating the currency trades between traders using the workstations; at least one trading workstation is associated with a telephone for providing voice communications between a trader associated therewith and other entities having telephone capabilities; and the trading workstation provides data communications between the trader associated therewith and other entities having data communication capabilities, to provide traders on the system with both voice-based and data-based trading functionality.

BRIEF DESCRIPTION OF THE DRAWINGS

FIG. 3 illustrates a user default screen;

FIG. 4 illustrates an expanded user default screen;

FIG. 5 illustrates a screen for selecting currencies in which one is willing to quote;

FIG. 6 illustrates a screen for selectively controlling and setting parameters associated with one's willingness to trade;

FIG. 7 illustrates an existing count restriction screen;

FIG. 8 illustrates an existing financial firm restriction screen;

FIG. 9 illustrates a screen for adding further country restrictions;

FIG. 10 illustrates a screen for adding further firm restrictions;

FIG. 11 illustrates an input screen for allowing a maker to enter an order;

FIG. 12 illustrates an order screen by which a maker monitors a hit to his/her order;

FIG. 13 illustrates a screen for monitoring an order;

FIG. 14 illustrates an alternative to FIG. 13 in which a hitter monitors a hit to an order;

FIG. 15 illustrates a screen for performing a negotiation;

FIG. 16 illustrates a market monitor screen;

FIG. 17 illustrates the market monitor screen of FIG. 18 with a pop-up menu listing available user selections for an empty cell;

FIG. 18 illustrates a single market monitor screen;

FIG. 19 illustrates a depth monitor screen;

FIG. 20 illustrates a market depth monitor screen;

FIG. 22 illustrates a request-for-quote screen;

FIG. 23 illustrates an alternative request-for-quote screen;

FIG. 24 illustrates a quote provider screen;

FIG. 25 illustrates a quote monitor screen;

FIG. 26 illustrates the market monitor screen of FIG. 18 with a pop-up menu on a cell containing an order not of the user;

FIG. 27 illustrates the market monitor screen of FIG. 18 with a pop-up menu on a cell containing an order of the user;

FIG. 28 illustrates the market monitor screen of FIG. 18 displaying a message to a maker;

FIG. 29 illustrates the action monitor screen of FIG. 21 showing maker that his/her order was hit;

FIG. 30 illustrates the action monitor screen of FIG. 21 showing a pop-up menu of available selections for a maker;

FIG. 31 illustrates the action monitor screen of FIG. 21 showing a hitter's view of a maker's spot response;

FIG. 32 illustrates the order monitoring screen of FIG. 13 with a pop-up menu allowing modification of a spot value;

FIG. 33 illustrates the action monitor screen of FIG. 21 showing a message displayed to a maker;

FIG. 34 illustrates the order monitoring screen of FIG. 13, in which a maker accepts a final spot value;

FIG. 35 illustrates the action monitor screen of FIG. 21 showing completion of a trade;

FIG. 36 illustrates a cash flow screen for a trade;

FIG. 37 illustrates the market monitor screen of FIG. 18 with a pop-up menu for selecting a request for a quote from available selections;

FIG. 38 illustrates the action monitor screen of FIG. 21 for showing a message to a quote provider;

FIG. 39 illustrates the action monitor screen of FIG. 18 in which a quote requester waits for responses to a provided quote;

FIG. 41 illustrates the action monitor screen of FIG. 18, in which a quote requester is provided with a best price from all quote requests;

FIG. 42 illustrates the action monitor screen of FIG. 18, in which the quote requester choose to execute a quote through a pop-up menu;

FIG. 43 illustrates a quote monitor screen in which a quote requester sees the counterparty's name;

FIG. 44 illustrates the action monitor screen of FIG. 21, in which a quote provider receives a hit on a quote;

FIG. 45 illustrates the action monitor screen of FIG. 18, in which the quote requester waits for a response to a hit on a quote;

FIG. 46 illustrates the action monitor screen of FIG. 18, in which a quote requester receives a spot from a quote provider;

FIG. 47 illustrates the action monitor screen of FIG. 18, in which the quote requester access a pop-up menu for selecting additional commands; and FIG. 48 illustrates a trade detail screen, in which the details of a quote request and negotiation are displayed to the quote requester.

DETAILED DESCRIPTION OF THE PREFERRED EMBODIMENT

Figure 1:
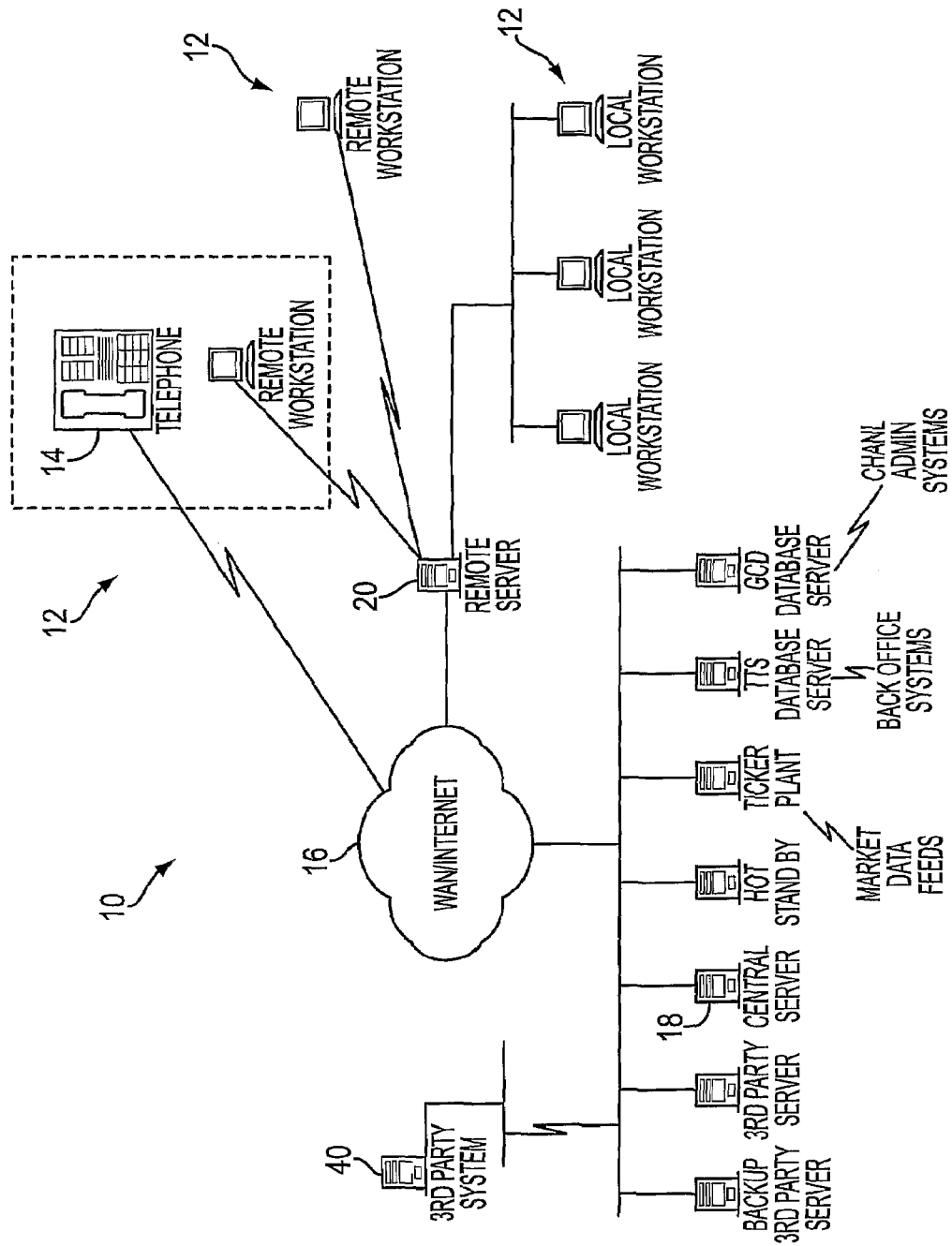
FIG. 1 illustrates a schematic of the foreign exchange forwards system.

Referring to FIG. 1, the foreign exchange forwards system 10 is shown in which multiple workstations 12, including trading computer systems and optionally telephones 14, are interconnected through a wide area network (WAN) supported by connections through the Internet 16 to a main central server 18 and related components. In the system 10, combined voice and electronic data are conveyed to interface the "BLOOMBERG" trading systems, which are primarily based on data displays, with the "TULLET & TOKYO" system which is voice-based. In such a combination of data and voice trading systems, the forward exchange forwards system 10 permits order entry and processing anywhere in the world.

In a preferred embodiment, all applications of the components of the system 10 shown in FIG. 1 operate on a "MICROSOFT WINDOWS NT", service pack 3 platform, with communications between servers and workstations being based on known TCP/IP session level connections.

The main central server 18 provides central storage of orders and other configuration data, and at least one backup central server 18 monitors the operation of the live components of the central server 18 in a hot-standby mode. All database updates to the main central server 18 are initially written to the standby server before being committed locally and delivered to the components in the network forming the system 10. A specialized database is maintained by both live and standby central server 18, with several tables stored in the database to maintain data describing the dealing environment of financial trading in forward currency exchange forwards. Other tables are proved to retain orders, ongoing this, completed deals, user client lists, user settings, etc.

In the preferred embodiment, the central server 18 always stores the latest version of any data, and also acts as arbiter between workstations when orders are taken off or when hits for trades are initiated.

The remote servers respectively support a plurality of workstations and also store a replica of one or more subsets of the trading databases held by the central server 18. A bespoke multi-cast methodology combined with a session-based back channel is used to ensure that the data is accurately received by each remote server. The remote servers filter orders based on the preferences and user default settings indicated by the various users of the workstations. For example, geographic and company-specific filters as well as specific clients or entities may be filtered, as described herein, such that a trader at a workstation with such filter settings does not receive and/or have displayed the unwanted orders from the filtered entities.

Third-party servers may also be provided and operate similar to the remote servers for data and order processing but do not support filtering. In addition, a ticker plant may be provided in the system 10 to import and export specific items of trading data from market feed vendors to the central server 18, and a global client database (GCD), for example, available through "TULLET & TOKYO FOREX INTERNATIONAL LTD.", may be maintained and replicated in the central server 18 along with various other tables.

A trade management system (TMS) database server may also be provided to receive notifications of completed deals from the central server 18, and the TMS database server then places the data regarding completed deals in a secure database table, which is replicated back to the central server 18 as a permanent trade blotter.

Each of the workstations 12 is connected to an associated remote server 20 to receive a subset of data replicated from the databases and tables of the central server 18 in a substantially continuous manner. In addition, a subset of the workstations 12 may be connected to and/or associated with telephones 14, connected to the WAN and/or to the Internet 16 using Internet telephony, or otherwise connected to a public switched telephone network (PSTN), to allow users to conduct trading with both the telephone for voice communications and the computer-based workstation for data communications. Accordingly, the system 10 is preferably a hybrid trading system for facilitating both voice-based and data-based trading functions.

In order to place orders, initiate hits, and other trading functions involved in the foreign currency exchange forwards, the workstations 12 establish direct interactive connections to the central server 18 as needed. Before an order is delivered from first workstation to a second workstation, the remote server associated with the second workstation check to determine if the order is subject to a restriction and/or filtering criteria imposed by the user and or by default at the second workstation. If so restricted, the order is not delivered. The restrictions may be particular to a given user, to a workstation, or to a remote server and all workstations connected thereto.

The central server 18 maintains a restrictions table of the various user defaults and filter preferences of each of the workstations and/or remote servers, and the tables are replicated in each remote server. For example, each record in the restrictions table indicates, per market, a client whose preference is expressed, and a client against whom the restriction is made.

Figure 2:
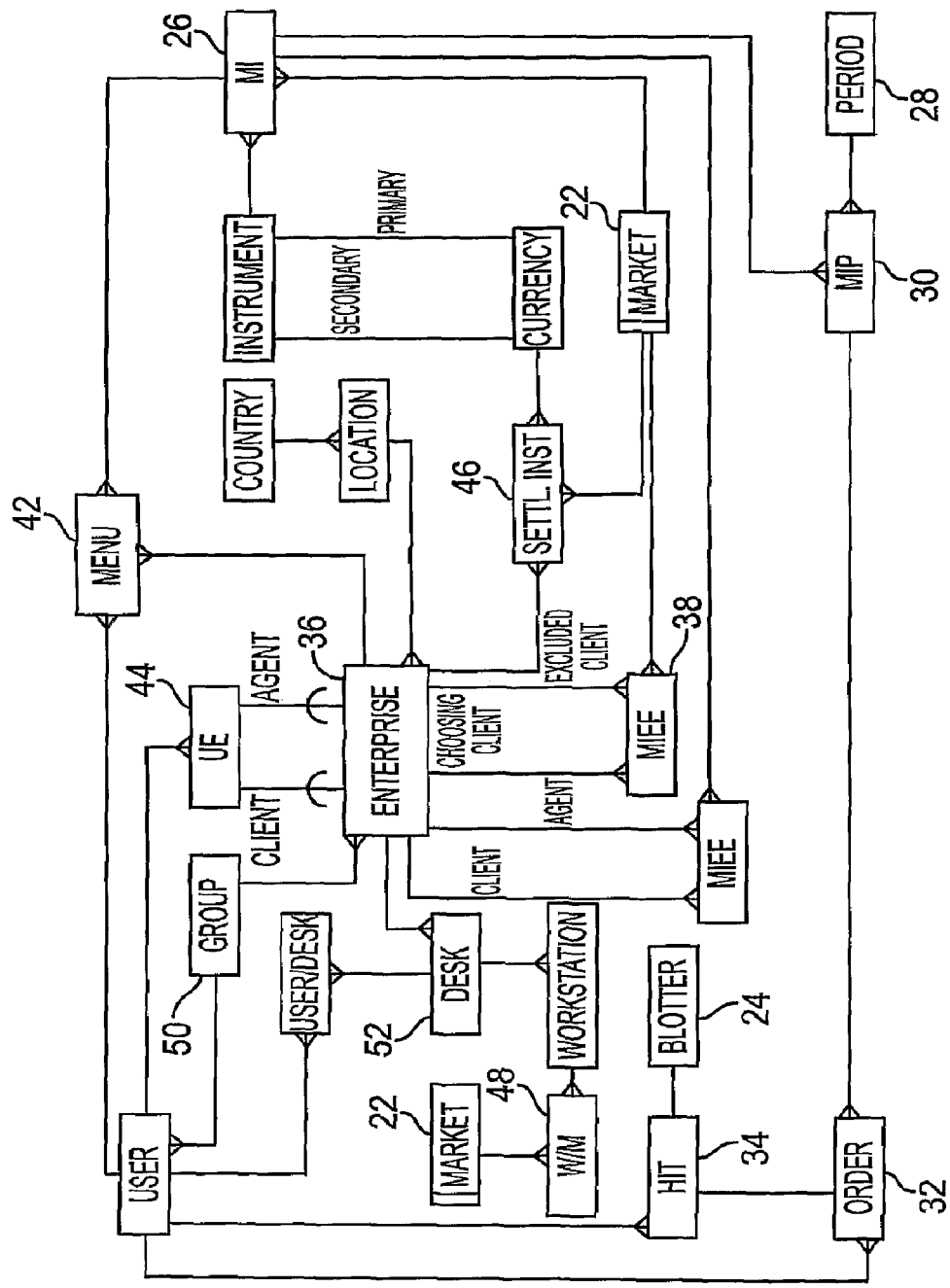
FIG. 2 illustrates a relational diagram of databases and tables storing financial information with the entities accessing such stored information.

FIG. 2 illustrates a relational diagram of databases and tables storing financial information with the entities accessing such stored information. Each database and table is customized for a particular purpose and a particular distribution method within the system 10. For example, a table 22 containing market types is sent to all workstations, while records in the blotter table 24 are sent only to those users who are originally involved in a deal.

The market table 22 includes records containing a market configuration, under which orders and transactions handled by the system are classified, such as a Forward Foreign Exchange (FX) order, a Spot order, etc. The fields in the records store and supply, for a given market, the market name, abbreviation, and miscellaneous configuration data.

Instrument records define sub-categories of a market, and may be associated with more than one market, and the combination 26 of a market and its instruments is abbreviated as "MI". For example, an instrument may be defined as a combination of two currencies for exchange in a permissible manner, so example instruments include a Dollar-Yen and a Dollar-Sterling. Instrument and MI records may contain the name and an abbreviation of the instrument and MI. All such MI records are stored in an MI table.

A period record stored in a period table 28 holds the definition of a further sub-division of an MI combination, and a period may be associated with more than one instruments and/or market. For example, in the forward foreign exchange market, an instrument may be defined as a pair of currencies in an exchange transaction, and the period for an order with the defined market and instrument may be indicated as a point in the future for a second part of the transaction in the order to occur. Such orders for market, instrument, and periods (MIP) may be categorized and stored in an MIP table 30.

In certain markets, such as the Spot market, only the market and instruments are specified, for example, as Spot and a pair of currencies, respectively, and no period is associated with such an order. Accordingly, a period record for a Spot order may indicate "No Period" and such a period record is associated with the specified combination of the market and instruments.

Market data records may be keyed with a composite key of an MI record, and the existence of the market data record indicates that the combination of market and instrument are valid. Other market data may be associated with a key corresponding to an order. For example, a Spot rate and end dates may be stored against an MI records for the Forward FX market types.

Orders are stored, for example, in a single-format order record, which are registered by the workstation, and all orders are stored in an order table 32. Initially, the workstation request all orders which belong to users logged or checked into the workstation, and thereafter additional orders are requested by supplying an MIP combination. The workstation and its associated remote server resolve any possible overlap of orders. For third-party applications accessing the system 10, the third-party application makes a single registration of all orders, and then receives the orders associated with permissible markets, which includes both orders belonging to the third-party application as well as those orders belonging to the users of the system 10 through the workstations 12 and remote servers 20.

Each order record groups price, amount, dates, and other relevant information defining an order in a trade. Identification (ID) codes may also be encoded or stored with the order, such as an ID of a user dealing with the order, and ID of a client associated with the order, and any IDs of additional agents associated with the order. The ID fields associated with an order may overlap or may be unique. For example, a voice broker using the system 10 through the telephone 14 may be placing the order on behalf of the client of another voice broker from another brokering institution, so the order generated has different IDs. In another example, a client having a workstation in the system 10 has an identical user ID and client ID, and the agent ID may be permanently set to indicate an electronic client order associated with the system 10.

Each order also has an associated distribution status which is utilized by users to indicate whether an order is good or is on hold. The central server 18 is able to intervene and change the status of an order so that an order is not distributed if the user managing the order goes off-line; that is, draft or held orders are not distributed without authorization by the user specifying the order is good-to-go.

A hit record is created and stored in a hit table 34 when an order is hit, so that the hit is tracked in the hit negotiation process. The hit record contains all of the relevant information from the original order being hit, along with information of the user and client indicating an intention to hit the price. As negotiation parameters are agreed upon, the hit record is updated in turn by the mater and the hitter of the order. By using a hit record to track the hitting process, the system 10 is able to withstand power outages or communication/computation errors at the workstations at the critical point of hitting an order. Upon recovery, the workstation and the system 10 re-establish the negotiations using the hit records.

The system 10 generates a blotter record for a hit which yields a completed deal. The blotter records are stored in the blotter table 24, with each blotter record containing a complete record of the transactions and parameters agreed. The blotter record stores information regarding the users involved in the transaction/hit, the clients between which the transfer occurs, and any other agents concerned in the transaction/hit.

Enterprise records identifying each enterprise are stored in an enterprise table 36. Enterprises refer to all clients, agents or users on the system 10, and companies must have at least one associated enterprise record in the enterprise table in order to connect to the system 10 and to participate in the dealing process. Each company in the enterprise table 36 has a location identifier, which is a key to the location table storing the name, abbreviation, and country of a location of the company.

A market and two enterprises (MEE) table 38 stores MEE records and composite keys which associate a given market with two enterprises/clients and which indicates counterparty preferences. Each MEE record indicates that, within the given market, the first enterprise does not wish to deal with the second enterprise. Remote servers consult the MEE table 38, and do not deliver orders to workstations in which one or both clients are not dealing with the other. The MEE table 38 is not registered; that is, each workstation does not receive a replica of the MEE table 38, since the filtering functions described herein and associated with the MEE table 38 are provided by the remote server on behalf of a respective workstation associated with the remote server 20. Such remote server filtering using the MEE table 38 conserve bandwidth usage in avoiding the sending of unwanted orders to and from workstations, and in avoiding delivery of the MEE table 38 itself.

A workstation 12 may access the MEE table 38 when a user thereof is editing the preferences to a single client, but in that event only the relevant portion of the MEE table 38 for the single client is downloaded to the workstation by supplying a marketing key of the MEE table 38 associated with the single client. Third-party applications from a third-party system 40 connected to the central server 18 may register and download the entire table in one operation to enable the application to manage its own filtering for its users.

Records reflecting a willingness-to-quote are stored in a combined record having a composite key combining information associating the market and instrument with an enterprise, a user, and a sub-user (MIEU) as an MIEU record involved in the willingness-to-quote functions described herein. Such MIEU records are stored in an MIEU table 42 accessed by a remote server 20 to perform the willingness-to-quote functions.

Other tables may include a user-enterprise (UE) table 44 associating users with enterprises, a settlement instrument table 46, a workstation-market (WM) table 48, as well as a group table 50 and a desk table 52 for managing users, workstations, and enterprises into groupings for administrative functions.

User Preferences and Defaults

FIG. 3 illustrates a user default screen, in which a user may set or modify settings associated with the user; for example, to filter entities by specified criteria such as bad credit, bad geography, etc., so that such entities are not even displayed to a user as the user conduct trades in the system 10. The default screen specifies the firm and/or a group within the firm, the firm's credit rating, location, country, and UUID number of the user, with such information being fixed by the company for which the user is employed. According, the user cannot customize such information.

The default screen also specifies customizable information and fields, such as the highlighted fields 54 for indicating whether or not the user/trader intends to trade by London rules, whether index numbers for trades are to be displayed, the minimum credit rating to be used by the credit filter, and the minimum amount of a trade to be used by the amount further, with the minimum amount being, for example, a multiple of a default trading amount such as U.S. $1 million. Other filter settings may be displayed and modified through the screen in FIG. 3, such as settings to filter location risk to avoid trading with companies in the specified countries, with the companies being listed according to country of incorporation. Also, specific companies may be filtered by institutional risk; for example, regulated or unregulated companies may engage in trading regulated or unregulated values, respectively, so a trader may avoid trading with the specified companies to avoid the risks associated with unregulated values.

In particular, the London rules setting being active indicates the action of the user on a secondary currency in a currency forward at the far end. For example, for a U.S. dollar (USD) and Japanese yen (JPY) exchange, if the user is a buyer of the forward, the user under London rules is selling the yen on the near date and buying the yen on the far date. However, for a user as buyer of the forward is not under London rules, the non-London rules setting refers to the action of the user on the primary currency at the far end; for example, the user is selling the USD on the near date and buying the USD on the far date. FIG. 4 illustrates an alternative user default screen, having fields for the name as well as the firm and group of a user, etc.

Figure 5:
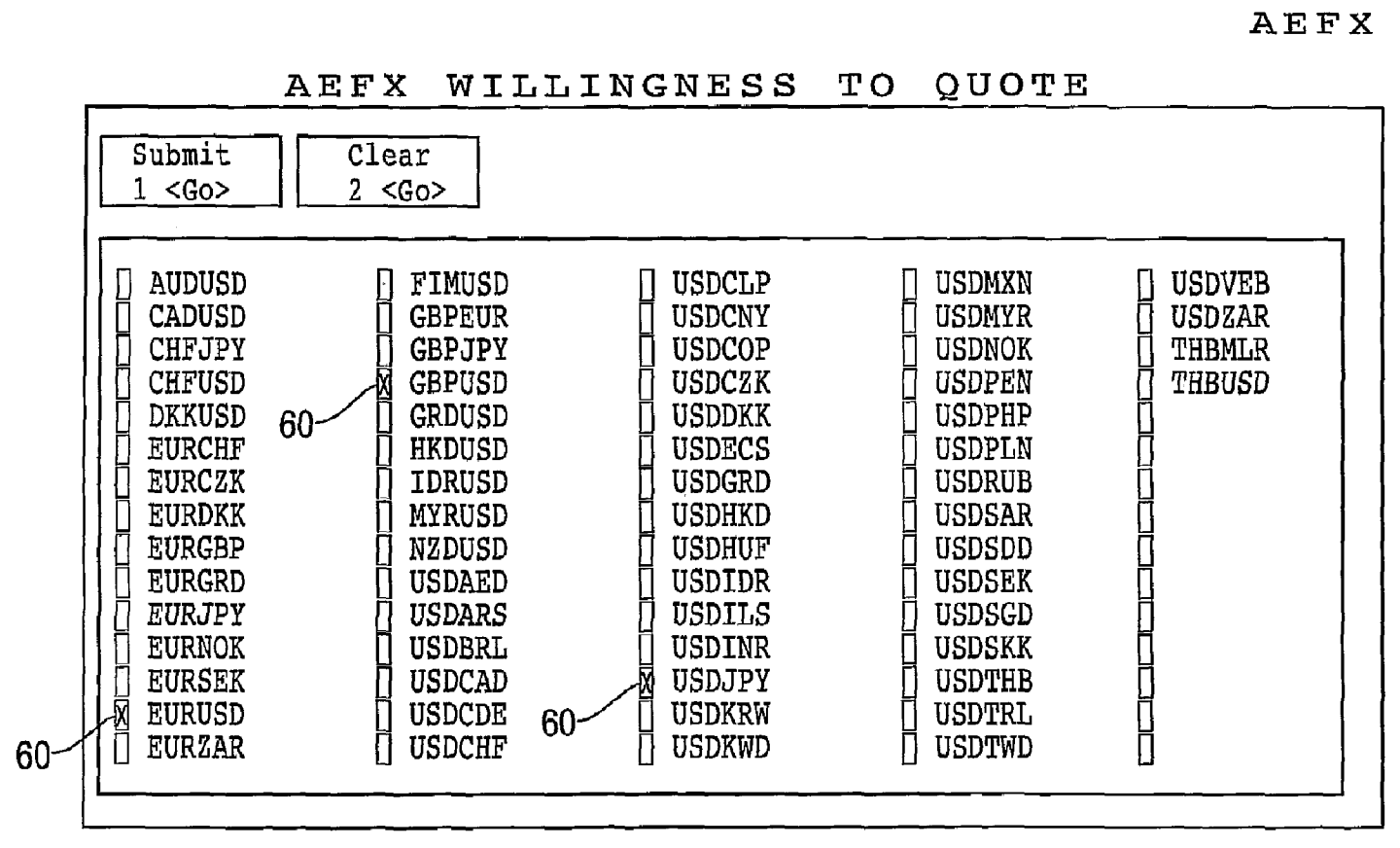

Referring to FIGS. 3-4, commands may be presented to initiate modifications and settings for specifying the willingness to quote and the willingness to trade by the user. FIG. 5 illustrates a screen for selecting currencies, for example, by placing an X in a box 60 adjacent to the currency codes in which one is willing to quote and exchange, such as USD to JPY and Euro (EUR) to JPY. FIG. 6 illustrates a screen for selectively controlling and setting parameters associated with one's willingness to trade, and so to set and modify the filtering criteria. Selection the listed choices causes a respective one of the screens shown on FIGS. 7-10 to be displayed.

FIG. 7 illustrates an existing country restriction screen, which filters out trades from countries by default unless the user overrides or otherwise modifies the setting, for example, by placing an X in a box 62 adjacent to a desired country. FIG. 8 illustrates an existing financial firm restriction screen, which filters out trades from firms and companies, such as trading and banking institutions, by default the user overrides or otherwise modifies the setting, for example, by placing an X in a box 64 adjacent to a desired company.

FIG. 9 illustrates a screen for adding further country restrictions; that is, countries not listed as being filtered by default on the screen in FIG. 7. Similarly, FIG. 10 illustrates a screen for adding further firm restrictions; that is, firms not listed as being filtered by default on the screen in FIG. 8.

Using the filters and features described with respect to FIGS. 3-10, a user of the system 10 may selectively view and trade with other traders and institutions according to the user's preferences, and so may effectively and efficiently focus on desirable entities for trade and currency exchanges. In addition, the user may selectively filter out an annoying trader or other undesirables such as high risk traders and companies by readily changing the company and country settings. Such customizable filtering may be used to effectively place an annoying or risky trader into a "penalty box", and so to allow a user to avoid trading or displaying trades of the penalized trader. In a preferred embodiment, the customizable filtering may be set to expire at the end of a predetermined time, such as five minutes or for the rest of the business day, and so the penalty box feature may be automatic but temporary to prevent such penalized traders from engaging in forthcoming foreign currency exchanges within the allotted penalty time period.

Order Entry and Processing

Once user defaults are set by the user or by an administrator supervising a remote server 20 and the workstations 12 associated with the remote server 20, the trading of foreign exchange currency forwards are preformed with such filtering and trading controls in operation. FIG. 11 illustrates an input screen for entering an order for a specific market and instrument, such as for EURUSD spot trades. An amount multiplier may also be shown, such as "1M" or "1Y" to indicate that the quantities are multiplied by one million or one billion, respectively, in which "Y" refers to yards; that is, billions in currency lingo. The current bid, ask, and spot prices are displayed, and the trader may specify an input price, the quantities for the near and fear dates, and the periods for the near and fare dates in highlighted input fields 66. Price increments such as 0.1, 0.25, 0.5, etc. may also be input. After actuating a SUBMIT command, such as "1 <GO>", the order is submitted to the system 10.

The remote servers 20 may also perform submitting the order or an edited order. For example, an error message is generated if the far amount is less than five times the market amount, if the far amount is less that the near amount, if the value dates are on a holiday, if the near date is not equal to today's date, if the far date precedes the near date, or if live orders exist within the market but the bid-rate is not less than the ask-rate under non-London rules. The system 10, through the remote server, may then generate a pop-up window to the user to provide an appropriate error message and to direct the user to correct the errors.

Orders are typically ranked on the display in terms of prices, with the best price at the time. Orders received at the same price are displayed according to the time of input, with first in displayed on top of the screen. When an order it held, the order loses its position on the order sheet unless the held order is re-submitted within a predetermined time period. However, edited orders do not lose their position in the order table unless the price has been changed, in which case the order is cancelled and a new order is created and display appropriately, by time or by best price.

In an alternative order entry and edit screen shown in FIG. 12, additional information such as bid and ask cash flows for the specified market and instruments may be displayed, and pull-down menus 68, 70 may be used to change the quantity or clear the quantity field, and to change the price increment or clear the price field. Accordingly, the trader has greater flexibility in entering and controlling input orders for foreign exchange currency forwards.

FIG. 13 illustrates a screen for hitting/taking an order which displays the quantities and terms of both the current trader and the counterparty. FIG. 14 illustrates an alternative hit screen for hitting an order, which may provide additional information such as cash flow data as well as status messages to the trader to indicate, for example, that a hitter is starting a hit. The available orders to be hit may be displayed by the market monitor and depth monitor screens, as described with reference to FIGS. 16-21.

Once an order has been hit, the order is removed from the market so that no other users may hit the same order. A hitter is able to see the hit in the action monitor, shown in FIG. 21. However, if a hitter attempts to but is not able to hit the order because someone else hit the order first, then the attempted hitter receives a message on the screens in FIGS. 13-14, such as a color-coded message and/or a text message indicating that the hit has failed. The failed hit may then be displayed on the action monitor screen in FIG. 21.

FIG. 15 illustrates a screen for taking a negotiation, which allows a user to modify terms such as the near, far, and spot values as well as the spot increment for a given market and instrument such as EURUSD SPOT, and to accept or decline the amounts or spot values by changing adjacent fields 72 to "Y" for acceptance or "N" for declining the currently displayed values.

During a trade negotiation, the user views the status of the negotiation, such as "Maker Setting Spot" or "Hitter Accepting Spot", and the names of the hitter and maker may be displayed to the respective counterparty in the negotiation. During the negotiations, the hitter and maker are able to submit new terms, such as changes in quantity, prices, and the spot by changing the terms on the screen and entering the SUBMIT command. The counterparty receiving the changed terms during the negotiations is able to respond by activating the REJECT CREDIT command in the event that the respective maker or hitter does not have sufficient credit for the negotiated terms. The rejecter does not see the counterparties' orders/hits/quotes for the remainder of the trading day.

From a rejection the maker must also select if the order is to be replaced or removed, and the hitter must select if the hit is to be converted to an order or not.

After selecting the rejection reason, the maker or hitter respectively activates the SUBMIT command to complete rejection of the hit, to terminate the hit negotiation, and to pass the rejection information to the central server 18.

In the event that the maker or hitter respectively have available credit, the negotiations continue. For the maker, the original amount of the order is displayed; however, if the hitter has input a different amount, the maker may accept the different amount by entering an ACCEPT AMOUNT command, which places the hitter's amount in the maker's amount field. If the amount is accepted, then there is no further negotiation on the amount, and the field cannot be changed by either party. The maker may either increase or decrease the amount by inputting a new amount.

If the hit is rejected, the negotiation concludes and the reason for the rejection is passed to the counterparty via a message, such as a color-coded message. The hit is then removed from the maker's action monitor of FIG. 21. The hit may remain in the action monitor of the hitter with an indication of a failed status. However, if the maker accepts the hit from the indicated hitter, then the maker must set the spot.

If the hitter has available credit and the maker has accepted the hitter's amount, the amount fields for both maker and hitter are the same and cannot be changed. However, if the maker's amount field has a different amount value from hitter's amount, the hitter may change the amount for further negotiation with the maker, or the hitter may accept the amount by entering an ACCEPT AMOUNT button, which then changes the hitter's amount to be the same as the maker's amount.

Figure 21:
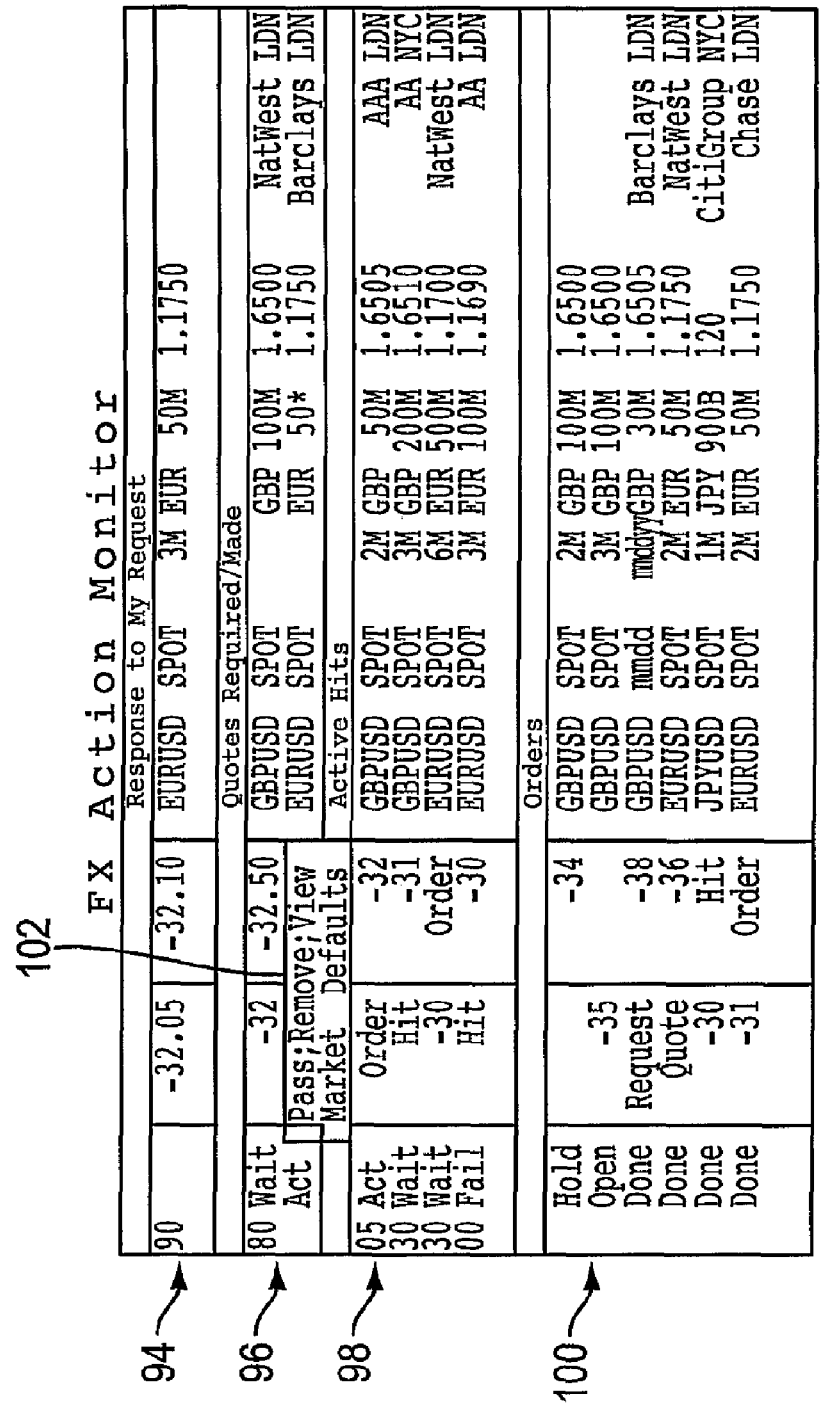
FIG. 21 illustrates an action monitor screen.

In addition, the hitter may accept the maker's spot price by entering an ACCEPT SPOT command, in which case the spot is then fixed and cannot be changed further by either party or by input of a new spot price. If all terms are accepted, then the negotiation is finished, and the trade is booked in the central server 18. A confirmation of acceptance is notified to both maker and hitter by a message, such as a color-coded message, indicating that the trade is completed. The negotiation is then removed from the respective active monitor visible to both maker and hitter, for example, as shown in FIG. 21, and the deal is placed by the central server 18 in the blotter table reflecting a done or completed deal.

Monitoring Screens

For displaying information on multiple instruments and periods to a user, monitoring screens are provided, for example, in FIG. 16 to display ten fixed periods and three instruments for each period in a row-by-column format having one cell per period per instrument. The periods may range from daily increments of over night (O/N); tomorrow next (T/N), that is, the day after tomorrow; spot next (S/N), that is, the day after spot date; weekly (W) increments for one, two, and three weeks, and multiple months up to twenty-four months (24M). The more commonly used periods may be displayed with the data in the table on a first page of multiple pages of the market monitor shown in FIG. 16, and the remaining table with other periods may 110 be accessed by a PAGE DOWN command.

Each cell 74 displays a trade index such as "12)", and lists the price, the currency identifier and the order amount, including flags thereafter for million (M) or billions (Y). A broken date indicator "B" may be displayed before the currency identifier to indicate that the listed price for that currency is a best bid/offer. For example, the cell having a trade index 12 in FIG. 16 illustrates a Euro-U.S. dollar exchange with a period of one month having a best bid/offer (B) price of 26.00 for 50 million units. The credit ratings of the order maker may also be displayed after the order amount. For example, in cell with trade index 45 in FIG. 16, the order maker has an AA credit rating. The cells and entries in the market monitor screen may be filtered according to the user settings based on the respective amounts and the credit ratings of the order makers.

FIG. 17 illustrates the market monitor screen of FIG. 16 with pull-down input menus 76-82 for user command selection. Each pair of currencies in the columns may indicate whether filtering is on or off using a text message 84, and a menu 82 may be displayed to toggle the filtering and the corresponding display of information for that currency, or to change the filters. For individual cells and orders therein, the user may access the menus 76-80 to trade in the listed order, for example, to hit the order, to hold or delete the order, to review the quotes or the order, etc. A menu may be accessed, for example, by clicking with the mouse through a graphic user interface displaying the screen of FIG. 16. In one embodiment, the menus 76-80 may be displayed by clicking the best bid/ask price to show, depending on the type of order, various options such as shown in Table 1:

TABLE 1

| Menu | Indicative only | User's own order | Other traders' orders |
|---|---|---|---|
| Hit | | | Yes |
| Bid Ask Quote | Yes | Yes | Yes |
| Single Quote | Yes | Yes | Yes |
| Depth | Yes | Yes | Yes |
| Single Order | Yes | Yes | Yes |
| Bid Ask Order | Yes | Yes | Yes |
| Off | | Yes | |
| Edit | | Yes | |
| Hold | | Yes | |
| Back | Yes | Yes | Yes |
| Function | Yes | Yes | Yes |

Accordingly, upon actuation of a cell, a respective menu is generated to be displayed downward from the selective order with available options displayed depending on the type of order. For example, cells 34, 43, and 66 have menus 76-80, respectively generated and extending downward from the top border of the respective cells 34, 43, and 66.

By activating the commands in the menus, additional displays are generated and displayed to the user, as shown in FIGS. 18-25. For example, by accessing the Order:Single function in the menu 76, FIG. 18 is displayed which illustrates a single market monitor screen showing all orders of a single currency exchange for all cells, and listing the amounts, credit rates, best bid/ask prices, etc.

By accessing the Depth command in the menu 76, the screen in FIG. 19 is displayed, which illustrates a depth monitor screen to display all open orders for a given instrument and period pair, with the orders sorted by price and entry time. For each order and cell index, the orders are displayed listing the prices/rates, the cumulative volume or sum of the trades for the specified currency, the type of currency (CCY) using a three digit ISO currency code, the amount or size of the individual order, and the maker and location, or alternatively the maker's credit rating and location, are also shown. In an alternative display shown in FIG. 20, the market depth monitor screen may also display a set of flags 86 to the user to indicate the presence of a broken date (B), the presence of an odd amount (O), or the presence of a split amount (S) in which an amount on the near end is different from the amount on the far end.

As with the market monitor screens of FIG. 17, actuation through the GUI of an order or other information, including displayed flags, on the screen of FIG. 20 causes the menus 88-92 or lists to be displayed to provide additional information or commands available, such as the options shown in Table 1. For example, by clicking on the sum field such as the cumulative volume value "220M", a list 92 of individual orders and their respective entry dates are shown which add up to the specified cumulative volume value.

Through the menus 76-80 in FIG. 17, the user may also enter an Action command to cause the system 10 to display an action monitor screen shown in FIG. 21, in which all activities of the user are displayed in which an action by the user is required. The screen displayed four windows 94-100 or panels for respectively listing all responses to a user's request for a quote, all quotes required or made by the user, all active hits of the user, and all open and/or executed orders of the user. Each panel may be further divided into columns listing: a clock value, such as in days, counting down when the action is to be performed by the user; a status indication of the activity; a bid price; an ask price; an indicator of the market and the instruments involved in the activity; a start date or period; an end date or period, a currency code; the amount of the activity in millions or billions or by a special indictor such as an asterisk indicating other amounts; the spot rate for the currency exchange; and the name and location of the mark.

For the status in panels for quotes and active hits, respectively, other status indicators may be used, such as WAIT signifying that the user is waiting for a response from a counter-party; ACT signifying that the user has to perform an action; and FAIL in which a failure in a hit negotiation is displayed to the hitter. In addition, a status indication in the active hits panel may include "T/O", signifying that a hit has timed out. Other status indicators may be used for the orders panel, such as HOLD for an order of the user placed on hold; OPEN signifying that the user's order is open; and DONE signifying that the user's order has been successfully hit.

The bid indicators in the active hits and the orders panels may include messages such as MY HIT indicating that an order has been hit by the user viewing the screen in FIG. 23; as well s MY ORDER indicating that the user's order has been hit by another trader; REQUEST indicating that the trade resulted from another trader's quote; and QUOTE indicating that the trade resulted from one of the user's quotes.

By actuating the respective panels, additional commands may be displayed in a pop-up window to select commands associated with the panels. For example, through the menu 102 displayed by actuating the quotes required/made panel, a user may select one of the following commands: an ENTER QUOTE command to display the quote entry screen of FIG. 22 for quote entry; a PASS or NO QUOTE command to reject and clear a quote request from the displayed quote request panel; a NO QUOTE/BLOCK command which rejections and clears the quote request and blocks further request from the rejected trader for a predetermined time, such as the next day, which performs the penalty box feature described herein; a MARKET command for displaying one of the market monitor display of FIG. 16; a DEFAULT command which activates and displays the user default screen of FIGS. 3-4; and a REMOVE or OFF command which removes a quoted price from the display. Activation of the other panels for request responses, active hits, and orders may include the same commands as well as panel-specific commands, such as a VIEW command provided in a pop-up menu which displays hit negotiation windows.

Through the pop-up menus 102 activated in the action screen of FIG. 21, and/or through a separate REQUEST FOR QUOTE or RFQ command entered by the user, the system 10 displays a request-for-quote screen shown in FIGS. 22-23, in which request for quotes may be generated, in which up to eight people can be selected and stored in a database who a trader is willing to trade with.

As shown in FIG. 22, the user can enter the instrument cross/exchange as well as the type of order, an amount, and an amount multiplier; for example, GBPUSD SPOT 9M. Through input fields 104, the user can enter the amount unit indicator, such as GBP; the period/value date; the near leg amount; and the far leg amount, which may be the same or different to the near leg amount. Through the firm input window 106, up to eight firms may be selected, for example, by toggling an X in a selection box 108 adjacent to firms which, by their defaults, have expressed a willingness to quote. Upon entering the selections and data into the screen of FIG. 22, the user submits the request-for-quotes to the selected firms by entering the SUBMIT command.

FIG. 23 illustrates an alternative request-for-quote screen, in which the user may also input the settlement spot value, and the user may also have an associated list of, for example, up to twenty firms on a favorite quote list 110 for which the user prefers to trade with.

By using the favorite quote list 110 and/or pre-selecting the quote providers from a list of available firms, the quote requester accepts that there is sufficient credit to compete the trade with the quote provider if the price is acceptable. In addition, since the quote provider is shown the name of the quote requester at the time of providing the quote, the quote provider is accepting that there is sufficient credit to complete the trade if hit by the quote requester. The system 10 may be implemented such that all terms of the deal have to be set at the time of the request, and that credit limits for both parties have been accepted by each party if the quote is hit, so that upon a hit the deal is done and there is no negotiation.

FIG. 24 illustrates a quote provider screen, which displays information of an available request-for-quote, such as the instrument and firm involved, from which the quote provider can decide to respond with a quote. Given the details of the request-for-quote, including the order type, instrument cross, amount, settlement spot, requester name and/or credit rating, etc., the quote provide may enter the appropriate choices, such as a SUBMIT command to submit a quote, including modifications of the bid and ask prices by the quote provider, such as a price of 73.575 set in the input field by the quote provider; a PASS or NO QUOTE command to pass on the request-for-quote; and a PASS & BLOCK command or NO QUOTE & BLOCK, in which the user passes on the request but also puts the requester in a penalty box to block further request-for-quote inquiries for a predetermined period, such as until the end of the business day. With a requester in the penalty box, any further request-for-quote inquires to the prospective quote provider are blocked, and the quote provider does not receive or view the blocked request-for-quote during the predetermined period.

FIG. 25 illustrates a quote monitor screen by which a quote provider may view his/her quotes, sorted in order of time entered, and specifying the prices, the instrument cross, the time period of the exchange, the name and/or location of the firm provided with the quote, etc.

Operation of the System and Method

In use, traders may be makers of orders and/or hitters of orders from makers, who receive the information through the screens in FIGS. 3-25 displayed on respective workstations 12 to conduct forward currency exchange forwards, mediated by the remote servers 20 and stored in the central server 18.

In one example, FIG. 26 illustrates the market monitor screen of FIG. 18 with a pop-up menu on a cell containing an order not of the user, providing a plurality of available selections and/or commands, such as execute/view trades, generate and display a market monitor screen, a depth monitor screen, an action monitor screen, etc., as described herein, as well as other commands to generate and conduct trades with other users. Each command in the pop-up menu may be actuated by double-clicking a mouse through a GUI in a manner known in the art, or by inputting an alphanumeric code associated with each command, such as "92" to display and modify the user's default settings and configuration.

FIG. 27 illustrates the market monitor screen of FIG. 18 with a pop-up menu on a cell containing an order of the user, which may include different commands than the pop-up menu shown in FIG. 26, for example, since an order in a cell owned by the user cannot be executed by the owner. Instead, an order owner may edit one's own order, may set the order on hold, etc. Commands/selections common to all users, such as monitor screens and default setting screens, are always displayed through the screens in FIGS. 26-27.

FIG. 28 illustrates the market monitor screen of FIG. 18 displaying a message 110 to a maker, indicating that the maker's order was hit by some other user as a hitter. The notified maker may then select an appropriate command through a pop-up menu generated for a cell for the hit order, to cause the action monitor screen shown in FIG. 29 to be displayed, which shows the maker that his/her order was hit in the active hits region of the screen, as well as any associated details of the hit. Through a pop-up menu shown in FIG. 30 and generated by selection of the active hit, available selections are provided to the maker to choose an action to take, such as viewing the hit, rejecting based on credit, etc.

On the other side of the hit transaction, the hitter, through the action monitor screen shown in FIG. 31, views the maker's spot response and can access a pop-up menu to perform a action in the trade, such as accept the maker's spot response. Alternatively, the hitter may change the final spot value through an order monitoring screen in FIG. 32, using a pop-up menu allowing modification of a spot value from a range of available values, such as 1.0375.

In response, the maker is notified of the modification of the spot by the hitter through a message 112 displayed in the action monitor screen shown in FIG. 33. Through the order monitoring screen shown in FIG. 34, the maker may accept the final spot value by inputting the appropriate values, such as "Y" for yes, and "N" for no in the Accept Amount and/or the Accept Spot input windows. After acceptance, the maker may view the completed trade though the action monitor screen of FIG. 35. FIG. 36 illustrates a cash flow screen for a completed trade, which the maker may access and view.

In another example of the use of the system 10 and the various screens described herein, quotes may be processed between a requester and a provider. As shown in FIG. 37, the market monitor screen of FIG. 18 is displayed with a pop-up menu for selecting a request for a quote from available selections, for example, to request a quote on the XEUXUS currency exchange with a spot 3M value. In response, potential quote providers may view available quote requests through the action monitor screen of FIG. 38, as well as any messages 114 to a quote provider.

While potential quote providers are considering and/or inputting their responses, the original quote requester may view the action monitor screen of FIG. 39 in which a quote requester waits for responses to a provided quote, for example, a response with index "25" in the Responses to My Quote Request region of the screen.

Figure 40:
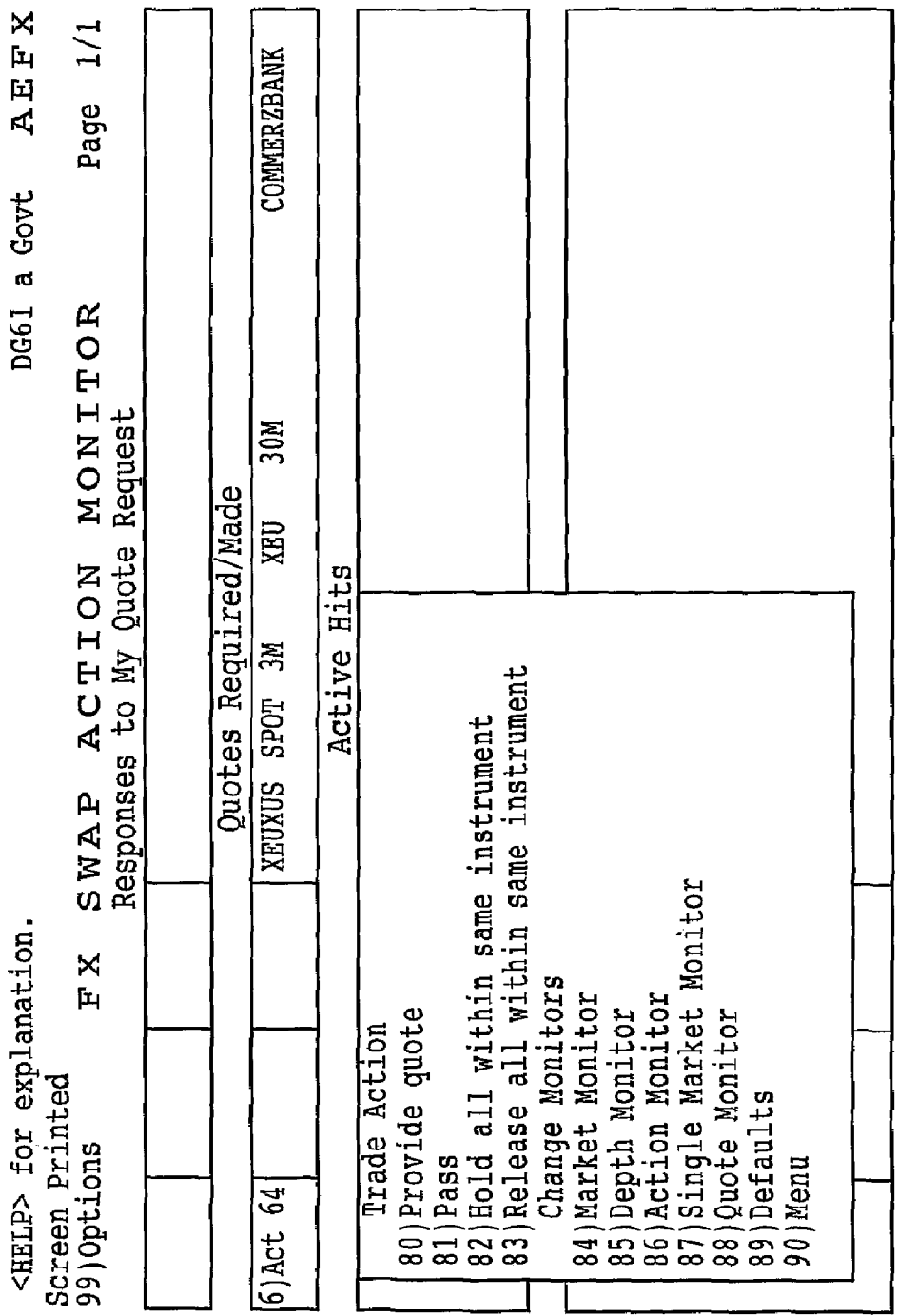
FIG. 40 illustrates the action monitor screen of FIG. 21, in which a quote provider chooses to provide a quote from a pop-up menu.

FIG. 40 illustrates the action monitor screen, in which a quote provider chooses to provide a quote from a pop-up menu. If the Provide Quote command is selected, then the quote provider generates a quote through the screen in FIG. 24, which is then displayed to the quote requester in FIG. 39.

FIG. 41 illustrates the action monitor screen through which a quote requester is provided with a best price from all quote requests. At this time, the quote requester, dissatisfied with the responses to his/her quote request, may cancel the quote by selecting the Quote Off command from a pop-up menu 116 generated and displayed over or adjacent to the Responses to My Quote Request region of the screen in FIG. 41. Alternatively, the quote requester may choose to execute one of the provided quotes, for example, using a pop-up menu shown in the action monitor screen of FIG. 42.

Once the quote requester begins executing the quote, the counterparty's name is provided with the details of the quote transaction shown in the quote hit screen of FIG. 43. Once the quote is hit, the quote provider may monitor the hit quote in the action monitor screen shown in FIG. 44, in which the active hit is detailed in the Active Hits region of the screen.

Through the action monitor screen of FIG. 45, the quote requester waits for a response to the requester's hit on a quote, in which the hit request is shown to the requester through the Active Hits region of the screen in FIG. 45. The status of the hit is indicated by the "Wait" message associated with the hit request. Upon receiving a response form the quote provider, such as the quote provider's spot, a quote requester receives indication of the spot from a quote provider through the action monitor screen in FIG. 46, for example, an indication such as the status message "Act" associated with the hit request, informing the quote provider that the quote provider has acted.

The quote requester may then view the final quote negotiation by accessing the pop-up menu shown in FIG. 47 through the action monitor screen of FIG. 46, from which the quote requester may enter the View command, which displays a trade detail screen shown in FIG. 48, in which the final spot value is displayed with other particulars of the quote and negotiation.

The disclosed forward currency forwards exchange system 10 and method have been described by way of the preferred embodiment. However, numerous modifications and substitutions may be made without departing from the spirit of the invention. Accordingly, the invention has been described by way of illustration rather than limitation.

What is claimed is:

1. A system for conducting electronic trading of foreign exchange forwards, the system comprising:
    a central server for tracking currency trades;
    a plurality of trading workstations; and
    at least one remote server interfacing the trading workstations to the central server, wherein the at least one remote server mediates currency trades between traders using the workstations by consulting trading configurations associated with each trader, wherein at least one of the trading configurations includes at least one temporary restriction settable by a first trader with respect to at least one trader and when set continuing until automatically reset in response to the occurrence of a predetermined time or the expiration of a predetermined time period and independently of a resetting by the first trader.

2. The system of claim 1, wherein the trading configurations correspond to filter settings for at least one filter criterion, and wherein the at least one filter criterion including the at least one temporary restriction is used by the remote server to block the display of trades from the at least one trader from view by the first trader.

3. The system of claim 1, wherein at least one trading workstation is associated with a telephone for providing voice communications between a trader associated therewith and other entities having telephone capabilities; and
    wherein the trading workstation provides data communications between the trader associated therewith and other entities having data communication capabilities, thereby providing traders on the system with both voice-based and data-based trading functionality.

4. A system for conducting electronic trading of foreign exchange forwards, the system comprising:
    a central server for tracking currency trades;
    a plurality of trading workstations organized in a plurality of groups for conducting electronic data-based trading, with a portion of the trading workstations associated with respective telephones for conducting voice-based trading;
    a plurality of remote servers, each respective remote server being associated with a respective group of trading workstations and interfacing the respective group of trading workstations to the central server, wherein the remote servers mediate currency trades between traders using the workstations by consulting trading configurations associated with each trader corresponding to filter settings for at least one filter criterion, which includes at least one temporary restriction settable by a first trader with respect to at least one trader and when set continuing until automatically reset in response to the occurrence of a predetermined time or the expiration of a predetermined time period and independently of a resetting by the first trader; and
    wherein a first remote server, connected to a first workstation associated with a first trader having associated first filter settings, blocks from view by the first trader any currency trades from other traders not meeting the at least one filter criterion corresponding to the first filter settings and also blocks from view by the first trader any trades of the at least one trader with respect to which the first trader has set a temporary restriction while the temporary restriction is in effect.

5. A method for conducting electronic trading of foreign exchange forwards, the method comprising:
receiving currency trades for foreign exchange forwards from traders using a plurality of trading workstations;
receiving trading configurations from traders using respective trading work stations including receiving from a first trader at least one temporary restriction settable by the first trader with respect to at least one trader and when set continuing until automatically reset in response to the occurrence of a predetermined time or the expiration of a predetermined time period and independently of a resetting by the first trader;
tracking the currency trades in a central server; and
mediating currency trades between traders using at least one remote server, including:
interfacing the workstations to the central server;
consulting trading configurations associated with each trader; and
controlling the distribution of trading information between traders based on the trading configurations, including temporarily blocking and restricting from the view of the first trader any trading information from each trader with respect to which a temporary restriction has been received from the first trader while the temporary restriction is in effect.

6. The method of claim 5, further comprising:
providing telephones respectively associated with a portion of the workstations for conducting voice communications between a trader associated therewith and other entities having telephone capabilities; and
providing data communications between the workstations and the traders associated therewith and other entities having data communication capabilities, thereby providing traders on the system with both voice-based and data-based trading functionality.

7. A system for conducting electronic trading of foreign exchange forwards, the system comprising:
a central server for tracking currency trades;
a plurality of trading workstations; and
at least one remote server interfacing the trading workstations to the central server, wherein the at least one remote server mediates currency trades between traders using the workstations by consulting filter settings for at least one filter criterion associated with each trader; and
wherein a first remote server, connected to a first workstation associated with a first trader having associated first filter settings, blocks from view by the first trader any currency trades from other traders not meeting the at least one filter criterion corresponding to the first filter settings, wherein the filter settings include at least one temporary restriction settable by a first trader with respect to at least one trader and when set continuing until automatically reset in response to the occurrence of a predetermined time or the expiration of a predetermined time period and independently of a resetting by the first trader, which blocks from view by the first trader any trades of the at least one trader with respect to which the first trader has set a temporary restriction while the temporary restriction is in effect.

8. A system for conducting electronic trading of foreign exchange forwards, the system comprising:
a central server for tracking currency trades;
a plurality of trading workstations; and
at least one remote server interfacing the trading workstations to the central server, wherein the at least one remote server mediates currency trades between traders using the workstations by consulting at least one filter criterion which includes at least one temporary restriction settable by a first trader with respect to at least one trader and when set continuing until automatically reset in response to the occurrence of a predetermined time or the expiration of a predetermined time period and independently of a resetting by the first trader, which blocks from view by the first trader any trades of the at least one trader with respect to which the first trader has set a temporary restriction while the temporary restriction is in effect.

9. A system for conducting electronic trading of foreign exchange forwards, the system comprising:
a central server for tracking currency trades;
a plurality of trading workstations; and
at least one remote server interfacing the trading workstations to the central server, wherein the at least one remote server mediates currency trades between traders using the workstations using a database listing a set of traders, stored in a memory of the remote server, with which a first trader is willing to trade, and wherein the remote server uses trading configurations including at least one temporary restriction settable by a first trader with respect to at least one trader and when set continuing until automatically reset in response to the occurrence of a predetermined time or the expiration of a predetermined time period and independently of a resetting by the first trader; and
wherein the remote server, responsive to a selection by the first trader of a subset of the set of traders, conveys a request-for-quote transmission from the first trader to the selected subset of traders except for requests for quotes of the at least one trader with respect to which the first trader has set a temporary restriction while the temporary restriction is in effect.

10. A system for conducting electronic trading of foreign exchange forwards, the system comprising:
a central server for tracking currency trades;
a plurality of trading workstations; and
at least one remote server interfacing the trading workstations to the central server, wherein the at least one remote server mediates currency trades between traders using the workstations using trading configurations including at least one temporary restriction settable by a first trader with respect to at least one trader and when set continuing until automatically reset in response to the occurrence of a predetermined time or the expiration of a predetermined time period and independently of a resetting by the first trader, and blocking from view by the first trader any trades of the at least one trader with respect to which the first trader has set a temporary restriction while the temporary restriction is in effect;
wherein at least one trading workstation is associated with a telephone for providing voice communications between a trader associated therewith and other entities having telephone capabilities; and
wherein the trading workstation provides data communications between the trader associated therewith and other entities having data communication capabilities, thereby providing traders on the system with both voice-based and data-based trading functionality.

* * * * *